United States Patent

Welch et al.

[11] Patent Number: 5,883,968
[45] Date of Patent: Mar. 16, 1999

[54] SYSTEM AND METHODS FOR PREVENTING FRAUD IN RETAIL ENVIRONMENTS, INCLUDING THE DETECTION OF EMPTY AND NON-EMPTY SHOPPING CARTS

[75] Inventors: Charles W. Welch; J. Michael Rozmus, both of Marlton; James L. Whiteman, Moorestown; Michael Negin, Mt. Laurel; William J. Herd, Blackwood, all of N.J.

[73] Assignee: AW Computer Systems, Inc., Mt. Laurel, N.J.

[21] Appl. No.: 598,395

[22] Filed: Feb. 9, 1996

Related U.S. Application Data

[63] Continuation-in-part of Ser. No. 270,912, Jul. 5, 1994, abandoned.

[51] Int. Cl.[6] .................................................. G06K 9/62
[52] U.S. Cl. .......................... 382/100; 382/155; 382/165; 382/168
[58] Field of Search .................................... 382/165, 170, 382/141–143, 100, 147, 160, 164, 181, 191, 128, 133; 358/522, 520; 235/383, 454, 462, 467; 186/55, 61, 62; 177/50

[56] References Cited

U.S. PATENT DOCUMENTS

| | | | |
|---|---|---|---|
| 3,709,121 | 1/1973 | Simonson et al. | 396/263 |
| 3,774,014 | 11/1973 | Berler | 235/467 |
| 3,949,194 | 4/1976 | Catto et al. | 235/475 |
| 4,145,715 | 3/1979 | Clever | 348/150 |
| 4,231,014 | 10/1980 | Ponzio | 382/194 |
| 4,237,483 | 12/1980 | Clever | 348/150 |
| 4,384,281 | 5/1983 | Cooper | 340/572 |
| 4,567,610 | 1/1986 | McConnell | 382/170 |
| 4,583,083 | 4/1986 | Bogasky | 340/572 |
| 4,598,420 | 7/1986 | Harvey | 382/141 |
| 4,606,065 | 8/1986 | Beg | 382/170 |
| 4,630,110 | 12/1986 | Cotton et al. | 348/153 |
| 4,676,343 | 6/1987 | Humble | 186/61 |
| 4,723,118 | 2/1988 | Hooley et al. | 340/568 |
| 4,736,098 | 4/1988 | Rehrig | 250/222.1 |
| 4,736,441 | 4/1988 | Hirose etal. | 382/101 |
| 4,741,042 | 4/1988 | Throop | 382/110 |
| 4,747,148 | 5/1988 | Watanabe | 382/141 |
| 4,747,153 | 5/1988 | Kouno et al. | 382/203 |
| 4,779,706 | 10/1988 | Mergenthaler | 186/61 |
| 4,783,830 | 11/1988 | Johnson et al. | 382/220 |
| 4,790,022 | 12/1988 | Dennis | 382/110 |
| 4,792,018 | 12/1988 | Humble | 186/61 |
| 4,797,738 | 1/1989 | Kashi | 348/93 |
| 4,797,937 | 1/1989 | Tajima | 382/165 |
| 4,929,819 | 5/1990 | Collins, Jr. | 235/383 |
| 4,939,355 | 7/1990 | Rando et al. | 235/467 |
| 4,940,116 | 7/1990 | O'Connor | 186/61 |
| 4,959,870 | 9/1990 | Tachikawa | 382/253 |
| 4,991,223 | 2/1991 | Bradley | 382/191 |
| 5,060,290 | 10/1991 | Kelly | 382/110 |
| 5,083,638 | 1/1992 | Schneider | 186/61 |
| 5,085,325 | 2/1992 | Jones | 209/580 |
| 5,103,488 | 4/1992 | Gemello et al. | 382/199 |
| 5,115,888 | 5/1992 | Schneider | 186/61 |

(List continued on next page.)

OTHER PUBLICATIONS

PCT International Search Report dated May 14, 1997, 2 pages.

*Primary Examiner*—Jon Chang
*Attorney, Agent, or Firm*—Woodcock Washburn Kurtz Mackiewicz & Norris LLP

[57] ABSTRACT

Purchase of an item bearing a unique identification code is verified by (a) ascertaining the identification code of an item to be purchased; (b) acquiring data representative of color features of the item to be purchased; and (c) comparing the data representative of color features of the item to be purchased to data representative of expected color features for items having the same identification code. Other physical characteristics of an item, such as height, may also be employed. The disclosed system is also capable of detecting whether a shopping cart is empty or not, and determining whether a non-empty cart is an indication that a theft is being attempted.

18 Claims, 11 Drawing Sheets

U.S. PATENT DOCUMENTS

| | | | |
|---|---|---|---|
| 5,123,494 | 6/1992 | Schneider | 177/50 |
| 5,125,465 | 6/1992 | Schneider | 177/50 |
| 5,150,307 | 9/1992 | McCourt | 364/478.11 |
| 5,154,260 | 10/1992 | Patel | 186/55 |
| 5,182,776 | 1/1993 | Suzuki et al. | 382/100 |
| 5,206,918 | 4/1993 | Levene | 382/110 |
| 5,216,502 | 6/1993 | Katz | 348/150 |
| 5,253,302 | 10/1993 | Massen | 382/110 |
| 5,305,391 | 4/1994 | Gomibuchi | 382/142 |
| 5,319,721 | 6/1994 | Chefales et al. | 382/160 |
| 5,355,163 | 10/1994 | Tomitaka | 348/234 |
| 5,444,556 | 8/1995 | Ito et al. | 358/501 |
| 5,473,369 | 12/1995 | Abe | 348/169 |
| 5,495,102 | 2/1996 | Fine | 250/222.1 |
| 5,610,584 | 3/1997 | Schrade | 340/568 |

…

SYSTEM AND METHODS FOR PREVENTING FRAUD IN RETAIL ENVIRONMENTS, INCLUDING THE DETECTION OF EMPTY AND NON-EMPTY SHOPPING CARTS

CROSS-REFERENCE TO RELATED APPLICATION

This is a continuation-in-part of application Ser. No. 08/270,912, filed Jul. 5, 1994, titled "System and Methods For Preventing Fraud in Retail Environments," now abandoned.

FIELD OF THE INVENTION

The present invention relates to security systems and methods for preventing fraud in retail check-out environments, such as supermarkets and the like. More particularly, the present invention relates to a security system and method that employs machine vision, object recognition, and other techniques to verify point-of-sale transactions and to monitor events at a retail check-out counter.

BACKGROUND

Retail stores, particularly supermarkets, lose a significant amount of their inventory due to fraudulent activities in the front-end checkout area. These losses are a combination of employee fraud, customer fraud, and procedural error. Understandably, the retail industry is continuously striving for ways to prevent such fraudulent activities.

With the advent of product identification codes, such as the Universal Product Codes (UPCs), most point-of-sale transactions are performed automatically or semi-automatically. For example, in supermarket environments, customers place items to be purchased on a feed belt at a checkout counter. A checkout clerk (i.e., "checker") passes each item over a scanning device and then places the item on a take-away belt that moves the item to a bagging area. The scanning device "reads" the UPC label on the item and sends the item's identification code to a point-of-sale (POS) system. The POS system maintains a database containing product information for each UPC code, including a description of the item and its price. When the POS system receives a scanned UPC code, it displays a description of the scanned item and adds the item's price to the purchase total. POS systems perform a number of other functions, including store inventory and accounting functions.

One form of customer fraud that can result in substantial losses for a supermarket involves removing the UPC label of a lower priced item and placing it over the UPC label of a more expensive item. At a checkout counter, unless the checker reads the description of each item after it is scanned, which is rarely the case, the customer will not be charged the true price of the item. Similar losses can occur if a store employee inadvertently misapplies the UPC code of a lower priced item to a higher priced item. A standard POS system simply cannot determine at the point of sale whether a UPC label has been deliberately or inadvertently misapplied to an item.

Unscrupulous checkout clerks can conspire with customers to defraud a store by failing to pass items over the UPC scanner before placing them on the take-away belt. Also, a checker can position a higher priced item on top of a lower priced item, scan only the lower priced item, and then place both items on the take-away belt. These and other methods of deceit can result in significant losses. Accordingly, systems and methods are needed for preventing fraud in retail checkout environments.

Schneider, U.S. Pat. No. 5,115,888, discloses a self-service checkout system in which customers perform scanning and bagging of items themselves at automated checkout counters. Once a customer has scanned all items to be purchased, the customer proceeds to a central area for payment. Such systems are intended to reduce the number of store personnel required for checkout operations. In an effort to prevent fraud, the customer is required to place each item on a scale after scanning the item's identification code. The scanned identification code and measured weight of the item are then transmitted to a computer that contains a database of expected weights for each unique product code so that the computer can verify the measured weight against the expected weight for the scanned item. If the measured and expected weights do not match within an acceptable tolerance, an alert is issued to a supervisory employee who may then review the transaction more closely. A video camera is positioned at each automated checkout counter so that a supervisory employee can review selected transactions from a remote location.

Humble et al., U.S. Pat. No. 4,792,018, discloses a similar operator-unattended checkout system in which both weight and shape of an item are verified against the scanned product code. The shape of an item is discerned as it passes through a light curtain; essentially a silhouette of the item is obtained. A database in the system contains expected weight and shape characteristics for each unique product code. A discrepancy between the measured and expected characteristics will cause the item to be rejected.

While the systems of Humble et al. and Schneider provide some degree of security against customer fraud, the use of weight and/or shape characteristics to differentiate purchased items is unacceptable in most practical applications. Supermarkets can have inventories of more than 30,000 different items. Such a large number of items cannot be adequately differentiated based on weight and shape characteristics alone. For example, two different frozen dinner products (i.e., "TV dinners") may have identical weight and shape characteristics, but one may be significantly more expensive than the other. Consequently, security systems and methods capable of a much higher degree of product differentiation are needed to overcome the limitations of the aforementioned prior art systems. The system and methods of the present invention satisfy this need.

SUMMARY OF THE INVENTION

The present invention is directed to a system and method for verifying the purchase of items in a retail checkout environment, such as a supermarket. A method for verifying the purchase of items in accordance with the present invention comprises the steps of: (a) ascertaining the identification code of an item to be purchased; (b) acquiring data representative of color features of the item to be purchased; and (c) comparing the data representative of color features of the item to be purchased to data representative of expected color features for an item having the identification code ascertained in step (a) from the item to be purchased. The purchase of the item is verified if the data representative of color features of the item matches, within a pre-determined tolerance, the data representative of expected color features for an item having that identification code.

The data representing color features of the item to be purchased may be generated from a color image of the item.

Preferably, the data representative of color features of the item to be purchased is derived from hue information in the image of the item. However, other color information may be employed to derive the color feature data, such as, for example, RGB color information. In a preferred embodiment, the data representing color features of the item to be purchased comprises a histogram having a plurality of bins, each bin representing a different range of hues and containing a count of the number of pixels in the image of the item that have a hue within that range.

Preferably, the expected color feature data for items having a particular identification code comprises a statistical representation derived from color feature data generated from previous images of items bearing that identification code. For example, the expected color feature data may comprise at least one reference vector having a plurality of elements equal to the number of bins in an item histogram. Each element of the reference vector preferably comprises (i) a mean value component representing the mean value of the corresponding bin of a plurality of histograms generated from other images of items having that particular identification code, and (ii) a standard deviation component representing the standard deviation of the corresponding bin of the other histograms, or some other statistical information.

Comparison of an item histogram to the reference vector representing expected color features of items having the same identification code preferably comprises the steps of (i) determining a measure of difference between the histogram and the reference vector and (ii) comparing the measure of difference to a threshold value. The purchase of the item is verified if the measured difference is not greater than the threshold value. Preferably, the measure of difference between the histogram and the reference vector scales with the variation (i.e., standard deviation) of each element of the reference vector.

A system according to the present invention comprises: means for ascertaining the identification code of an item to be purchased; an imaging device for acquiring an image of the item to be purchased; an image processor coupled to the imaging device for processing the image of the item to be purchased and for generating therefrom data representative of color features of the imaged item; a database containing data representative of expected color features for each of a plurality of different items, correlated with the respective identification codes associated with each item; and a controller coupled to the image processor and the database for (i) retrieving from the database the expected color feature data correlated with the identification code ascertained from the item to be purchased, and (ii) for comparing the expected color feature data retrieved from the database with the color feature data generated from the image of the item to be purchased. Preferably, the controller compares the color feature data generated from the image of the item to be purchased with the expected color feature data retrieved from the database by (i) obtaining a measure of difference between the color feature data generated from the image of the item to be purchased and the expected color feature data retrieved from the database, and (ii) comparing the measured difference to a threshold value. The purchase of the item is verified if the measure of difference is not greater than the threshold value.

Another security feature provided by the present invention is the identification of "empty and non-empty" shopping carts. According to this aspect of the invention, the system will record the presence of a product in the shopping cart. The item database will specify the permitted handling of an item, which may include the identification of certain "large" items that may remain in the cart. The system handles "large" items that are too large for the take-away belt by checking for an item designated as "large" in the transaction. If such an item is in the transaction, a non-empty cart will be permitted. The system will also detect a non-empty cart in the checkout aisle with no "large" item in the current transaction, which may be an indication of attempted fraud.

In preferred embodiments, in order to meet the above requirements for empty cart detection, the system will learn the appearance of empty carts; locate carts within the cart isle; determine whether the cart is empty; designate items as "large" in the item database; detect items designated as "large" in the transaction; and generate prescribed events (e.g. an alarm) when a non-empty cart is detected and no "large" item is in the current transaction.

Additional features and advantages of the present invention will become evident hereinafter.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings.

DETAILED DESCRIPTION OF THE PREFERRED EMBODIMENTS

An important feature of the present invention is based on the recognition that items for sale in a retail environment, such as a supermarket, have very perceptible and unique color features due mainly to the unique labeling and trade dress displayed on these items. For example, despite the almost identical weight and shape of many frozen dinner products, customers have little difficultly distinguishing among different brands due to the unique color features inherent in the labeling and trade dress of the respective brands. According to the present invention, after ascertaining the product identification code (e.g., UPC) of an item to be purchased, data representing the unique color features of the item is generated from an image of the item and then compared against expected color features for items having that identification code. By basing verification of a purchase transaction on the unique color features of an item, the limitations of prior art systems that rely solely on weight and/or shape characteristics are overcome. It is understood, however, that in addition to the color features of an item, characteristics such as weight, height and shape can be employed to enhance accuracy without deviating from the spirit and scope of the present invention. As used herein, the word "item" means any object, article or thing capable of being purchased in a store, and the term "identification code" means any pattern, symbol, mark or other designation used to identify a stock item in a store, including Universal Product Codes (UPCs) and the like.

Color is often treated as a combination of the three primary colors, red, green and blue (RGB). Red, green and blue are referred to as additive primary colors because relative amounts of each can be added together to produce a single perceived color in the visible spectrum. Computer monitors and video cameras often operate in accordance with the RGB color model. Other color models have been developed for a number of applications. For example, the YIQ model is used in commercial color TV broadcasting. Essentially, the YIQ model is a recoding of RGB values to achieve more efficient transmission of color television signals and to maintain compatibility with monochrome television standards. Another color model, popular in color printing and copying applications, is based on a combination of the subtractive primary colors, cyan, magenta and yellow (CMY). In most cases, equations exist for transforming between the RGB color model and these other models.

Figure 1B:
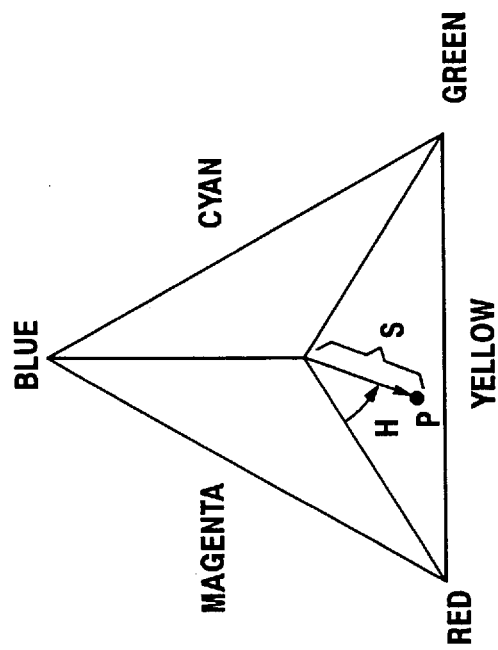
FIGS. 1(*a*) and (*b*) are a graphical representation of the HSI color space.

Color can also be represented in terms of hue, saturation and intensity (HSI). Hue is a color attribute that describes a pure color, such as pure red, pure green, pure blue, pure yellow or anything in between. Saturation is a measure of the degree to which a pure color is diluted by white light. A highly saturated color has a low white content. Finally, intensity describes the relative brightness or darkness of a color. Three-dimensionally, the HSI color space can be represented as a three-sided, pyramid-like structure such as that shown in FIG. 1(a). FIG. 1(b) is a horizontal cross-section of the pyramid-like structure and represents a region of constant intensity. As shown, the hue (H) of a color point (P) is determined by the angle formed with respect to the red axis of the color triangle. An angle of 0° represents a hue of red, an angle of 60° represents a hue of yellow, and so on. Saturation is represented by the distance from the point P to the center axis of the color triangle. Any points along the outside of the triangle (i.e., points on the surface of the three-dimensional structure) represent purely saturated colors, the hue of that color being determined by its angle with respect to the red axis and its intensity being determined by its perpendicular distance from the bottom vertex of the three-dimensional structure. Additional information concerning the HSI color model may be found in Gonzalez and Woods, *Digital Image Processing*, pp. 229–235 (1992), which is hereby incorporated by reference.

As with many color models, it is relatively easy to calculate the values of hue, saturation and intensity from the red, green and blue component values in the RGB color model. For example, given a digital image of an object wherein each pixel has a red (R), green (G) and blue (B) component value, the corresponding values for hue (H), saturation (S) and intensity (I) can be obtained as follows:

$$H = \text{TAN}^{-1}\left(\frac{2R - G - B}{\sqrt{3}\ (G - B)}\right).$$

$$S = 1 - \frac{3(\text{MIN}(R,G,B))}{(R + G + B)}$$

and $$I = \frac{R + G + B}{3}$$

Although the present invention is not limited to use of any one color model, the HSI color model is preferable because humans perceive color in terms of hue and saturation. Additionally, as described in greater detail below, in the preferred embodiment, the system of the present invention focuses mainly on the hue component of the HSI color space, which allows the system to accurately identify items despite irregular lighting conditions.

Figure 2:
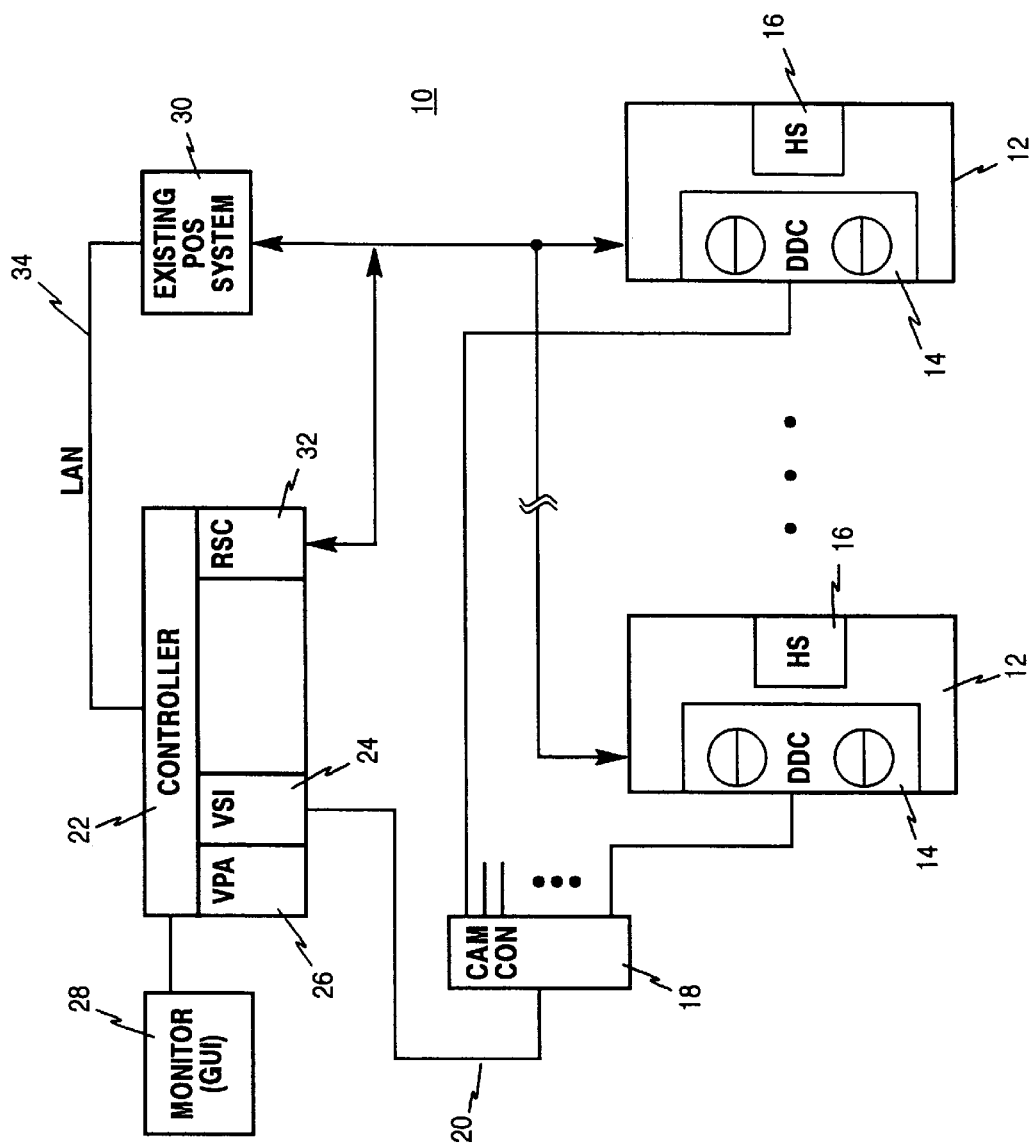
FIG. 2 is a block diagram of a system for preventing fraud in a retail checkout environment in accordance with a preferred embodiment of the present invention.

Referring now to the remaining drawings, wherein like numerals indicate like elements throughout, there is shown in FIG. 2 a preferred embodiment of a system 10 for preventing fraud in a retail checkout environment in accordance with the present invention. As shown, the system comprises a plurality of checkout stations 12. In the preferred embodiment, up to sixteen checkout stations may be provided. Each checkout station has an imaging device 14 for acquiring an image of an item to be purchased, and a height sensor 16 for sensing the height of an item to be purchased.

In the preferred embodiment, the imaging device 14 at each station 12 comprises a camera having two CCD image sensors and associated lenses, one for acquiring close-up images of an 18 in.×18 in. area of the take-away belt of the checkout station 12, and the other for acquiring larger, overview images that include a portion of the cart aisle adjacent the checkout station 12. Both sensors can capture either monochrome or color images. Monochrome images generated by the imaging device 14 comprise 242 lines of 251 8-bit pixels, for a total of 60,742 pixels. Color images comprise 726 lines (242 lines each for R, G and B) of 251 8-bit pixels, for a total of 182,226 pixels. In the present embodiment, the close-up lens and associated image sensor are employed to acquire (i) close-up color images of the take-away belt at a typical rate of one frame/sec, and (ii) close-up monochrome images of the take-away belt at a rate of ten frames/sec. The overview lens and associated image sensor are employed to obtain monochrome images of the checkout station 12 and adjacent cart aisle at a rate of four frames/sec. Each color video frame includes red, green and blue component pixel values representing the relative amounts of each of those primary colors. Preferably, the imaging devices 14 are rigidly mounted 9 to 14 feet above floor level.

Preferably, the height sensor 16 comprises an ultrasonic sensor that uses ultrasonic ranging techniques to measure the peak height of an item on the take-away belt (not shown). Ultrasonic ranging devices are described in detail in Shirley, *An Introduction to Ultrasonic Sensing*, SENSORS (November 1989), which is hereby incorporated by reference. In the present embodiment, the ultrasonic height sensor 16 at each station 12 is mounted over a portion of the take-away belt that corresponds to the 18 in.×18 in. field of view of the imaging device 14 at that station 12. Each sensor 16 has a circular field of view with a diameter of approximately 18 in. It is understood that other height sensing technologies may be employed, and the present invention is by no means limited to ultrasonic height sensing devices. For example, height sensors based on laser ranging techniques may be employed. Alternatively, a light curtain device may be employed.

The output of each imaging device 14 is coupled to a camera concentrator 18 ("CAMCON") that multiplexes the digital video data output from selected ones of the imaging devices 14 in a time-division manner and provides the multiplexed video data to a system controller 22 via a dual optical fiber link 20. In the present embodiment, the CAMCON 18 is capable of multiplexing the video data of up to four imaging devices 14. Thus, in the present embodiment, four checkout stations 12 can be actively monitored at any given time. It is understood, however, that the CAMCON 18 can be modified to multiplex the video data of any number of imaging devices 14 without deviating from the spirit and scope of the present invention. Additionally, any multiplexing technique, such as frequency division multiplexing, can be employed to multiplex the video data from the respective imaging devices 14.

A video system interface (VSI) 24 is coupled to the CAMCON 18 through the optical fiber link 20. The VSI 24 receives the multiplexed video data from the CAMCON 18, demultiplexes the data, and provides the demultiplexed video data to a video processing accelerator (VPA) 26. The VPA 26 processes images received from each checkout station 12, as described hereinafter in greater detail. A controller 22 controls the overall operation of the system 10. In the present embodiment, the controller 22 is embodied in a high-performance computing system, such as a high-end personal computer or workstation, and the VPA 26 and VSI 24 are implemented on respective interface cards coupled to the computer system. The controller 22 and VPA 26 communicate with each other via the computer system bus (not shown). The VSI 24 and VPA 26 communicate via direct connections. A video monitor 28 is coupled to the controller 22 for viewing images acquired by the imaging devices 14 at each checkout station 16. A supervisory employee can interact with the controller 22 to view selected checkout station transactions remotely on the video monitor 28. Further details of the CAMCON 18, controller 22, VSI 24 and VPA 26 are provided below. It is understood, however, that the CAMCON 18, controller 22, VSI 24 and VPA 26 are not limited to the embodiments described herein and their respective functionalities may be implemented in any suitable manner. Additionally, in other embodiments, the respective imaging devices 14 may be coupled directly to the VPA 26 and/or controller 22, eliminating the CAMCON 18 and VSI 24.

Each checkout station 12 has a POS terminal (not shown) coupled to a central POS system 30. Transaction data, including scanned identification codes and purchase totals, are transmitted between each terminal and the central POS system 30. The controller 22 is coupled to the POS system 30 via a local area network (LAN) 34. In the preferred embodiment, the controller 22 includes a Register Simulation Card (RSC) 32 that enables the controller 22 to appear as a register to the POS system 30. This enables the POS system 30 to communicate directly with the controller 22 so that the controller 22 can get relevant POS transaction information, particularly scanned identification codes, immediately after the information is generated at a checkout station 12. The security system 10 of the present invention can be adapted for use with any existing POS system.

According to one aspect of the present invention, a database containing data representative of expected color features for each of a plurality of different items is stored in a memory device (not shown) coupled to the controller 22. The memory device may comprise a RAM, ROM, optical disc drive, magnetic hard disk drive, or other suitable storage device. The expected color feature data for each item is stored in the database correlated with the unique identification code for that item. That is, the unique identification code of an item can be used as an address, or index, into the database to retrieve expected color feature data and other relevant information associated with items bearing that identification code. For example, in addition to providing expected color feature data for an item, the database may also provide the following information: (1) the date the item was last purchased; (2) an indication of the handling status of the item, i.e., whether the item is (a) one that should appear on the take-away belt, (b) a large item that may remain in the cart, (c) a crushable item or (d) a hand-carried item, i.e., any item that is normally not placed on the take-away belt, including sidewalk sale items, pocket items, fragile items etc; (3) a learning flag indicating whether the system has "learned" the color features (and other physical characteristics) of the item; (4) the number of times the item has been purchased; (5) the date the item was first purchased; (6) the date the item was identified as having been sufficiently "learned" by the system; and (7) the number of times the item was purchased or processed by the system prior to the date upon which it became "learned". In the present embodiment, the database may contain up to 75,000 item records, and requires approximately 150 to 200 megabytes of storage.

Figure 3:
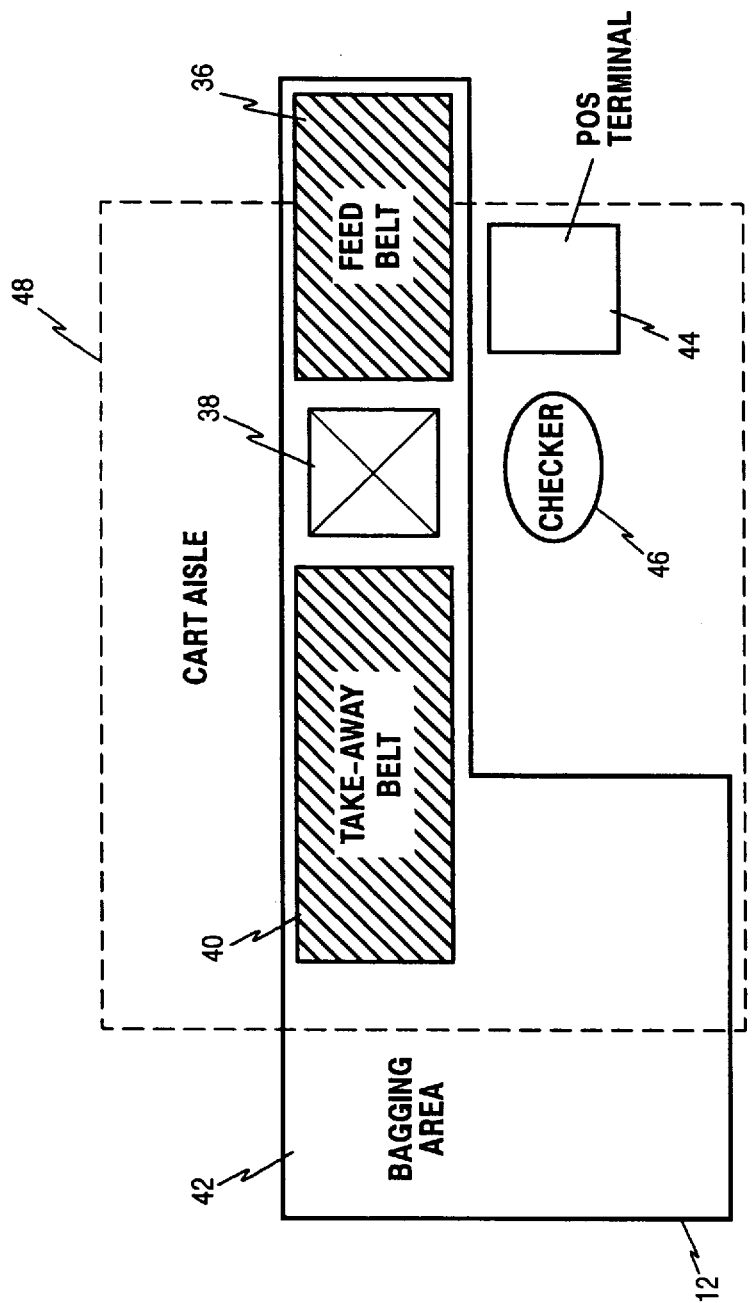
FIG. 3 illustrates an overhead view of a checkout station of the system of FIG. 2.

FIG. 3 is a top view of one of the checkout stations 12 of FIG. 2. As shown, each checkout station 12 comprises a feed belt 36, an optical scanner 38 and a take-away belt 40. A customer (not shown) wishing to purchase items enters the cart aisle adjacent the checkout station 12 and places items to be purchased on the feed belt 36. A checkout clerk (i.e., "checker") 46 grasps each item to be purchased, passes the item over the optical scanner 38 and then places the item on the take-away belt 40. The take-away belt 40 carries each item to the bagging area 42. The optical scanner 38 ascertains the unique identification code affixed to each item and passes the identification code data to a POS terminal 44. The POS terminal 44 communicates the ascertained identification code to the central POS system 30 (FIG. 1). Preferably, the optical scanner 38 comprises a laser scanning device, sometimes referred to in the art as a bar code reader, that optically scans the item's identification code (e.g., UPC) and provides data representing the scanned identification code to the POS terminal 44. Alternatively, the unique identification code of an item can be keyed into the system at the POS terminal 44. The optical scanner 38 and POS terminal 44 each comprise a means for ascertaining the identification code of an item to be purchased.

As mentioned above, the imaging device 14 provided at the checkout station 12 acquires both monochrome and color close-up images of the take-away belt 40, as well as a monochrome overview image that includes a portion of the cart aisle. Dashed lines 48 illustrate the preferred field of view obtained with the overview lens of the imaging device 14. Preferably, the take-away belt 40 is black so as to provide a uniform dark background in close-up images. Use of a black take-away belt 40 enables the pixels of an imaged item to be readily distinguished from the pixels representing the take-away belt.

According to the system and method of the present invention, the purchase of an item is verified by ascertaining the identification code of the item, acquiring data representing color features of the item, and then comparing that data to data representing expected color features for item's bearing that identification code. In addition, other physical characteristics, such as the item's height and area, can be compared to enhance accuracy.

Figure 4:
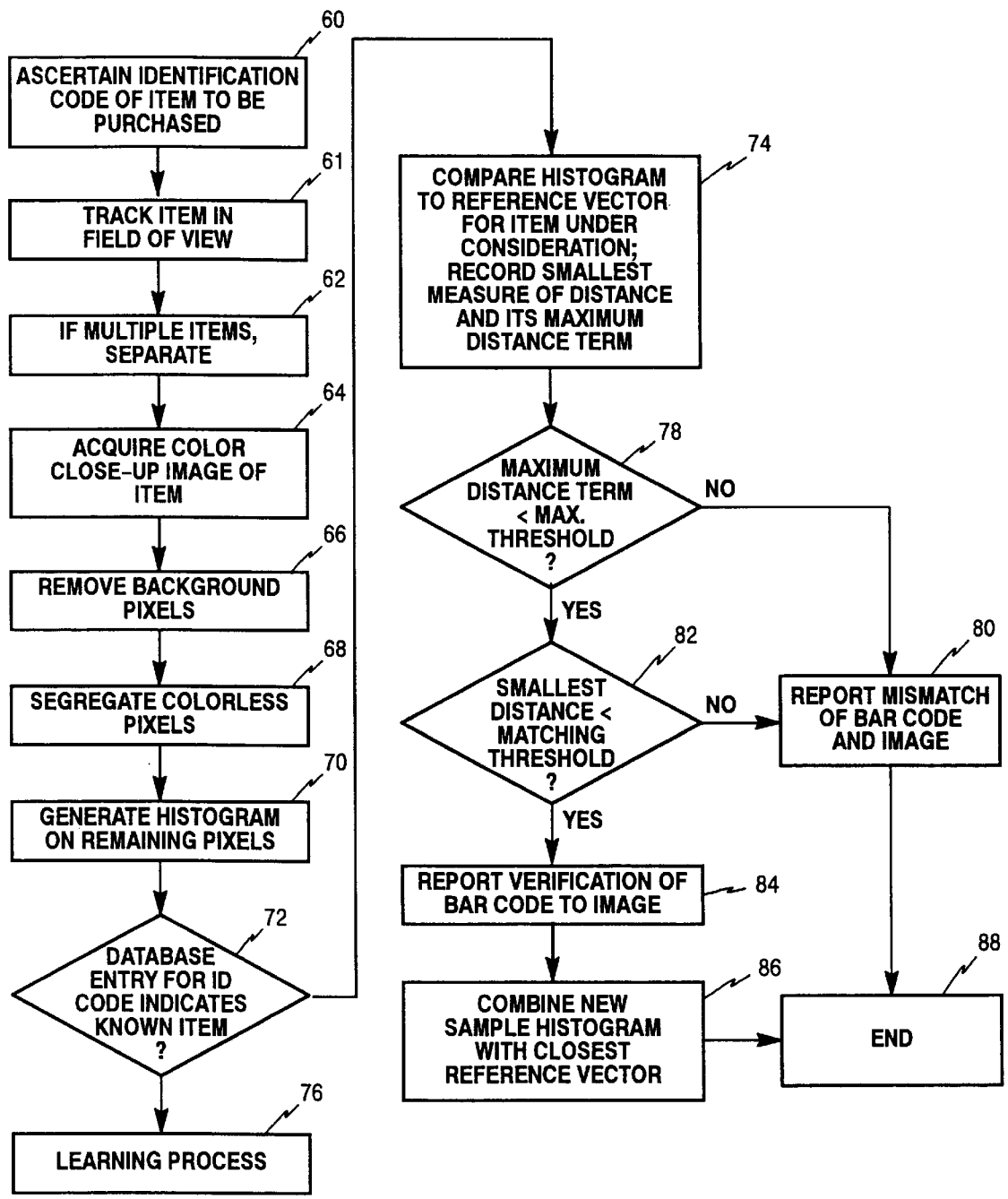
FIG. 4 is a flow diagram illustrating both the operation of the system of FIG. 2 and a preferred embodiment of the methods of the present invention for verifying the purchase of items.

FIG. 4 is a flow diagram illustrating both the operation of the system 10 of FIG. 2, particularly the operation of the controller 22 and VPA 26, as well as a preferred embodiment of the method of the present invention. The steps illustrated in FIG. 4 are performed at each checkout station 12 and for each item to be purchased at the checkout station 12. At step 60, the unique identification code of an item to be purchased is ascertained by, for example, passing the item over the optical scanner 38 of FIG. 3. Alternatively, the identification code can be manually keyed into the system 10 using the POS terminal 44. The item to be purchased is then placed on the take-away belt 40. At step 61, successive close-up monochrome images of the take-away belt 40 are processed by the VPA 26 to determine when the item has completely entered the field of view of the imaging device 14. As the item enters the field of view of the imaging device 14, the VPA 26 will detect the presence of non-background pixels at the edge of one of the images of the take-away belt 40. Successive images of the take-away belt 40 are then examined until non-background pixels are no longer detected at any edge of the image. At this point, the VPA 26 assumes the item has completely entered the field of view of the imaging device 14.

In the present embodiment, background pixels (i.e., pixels representing the dark take-away belt) are distinguished from the pixels representing an item to be purchased by use of an intensity threshold. Each pixel of a close-up monochrome image of the take-away belt 40 has a value representing the intensity (i.e., grey scale level) of that point in the image. As each monochrome image is received, the VPA 26 compares the intensity value of each pixel to a threshold value. Pixels that exceed the intensity threshold are identified as non-background pixels.

One problem encountered in distinguishing background pixels from item pixels based on relative intensities is that uneven lighting conditions across the field of view of the imaging device can cause the intensity of the uniform background of the take-away belt 40 to vary at different points across the image. In the present embodiment, intensity variations resulting from uneven lighting conditions are effectively removed by dividing the field of view into a 4×4 grid of sub-fields and calculating a different background threshold for each sub-field. Specifically, prior to use of the system, a plurality of sample images of the take-away belt are obtained. An intensity threshold is then calculated for each sub-field from the sample image values according to the following formula:

$$b_{ij} = \mu_{ij} + N\sigma_{ij}$$

where, $b_{ij}$ is the threshold intensity value of sub-field (i,j);

$\mu_{ij}$ is the mean value of the intensities of the sample pixel values obtained for sub-field (i,j);

$\sigma_{ij}$ is the standard deviation of the sample pixel values; and

N is an empirically-derived positive coefficient.

A value of N=2 has provided satisfactory results in experimental uses of the system 10.

Once the VPA 26 determines that the item to be purchased has completely entered the field of view of the close-up lens of the imaging device (i.e., non-background pixels no longer appear at any edge of a monochrome close-up image), control passes to step 62 where the VPA 26 performs a standard "blob" analysis to determine if more than one item has entered the field of view, i.e., whether the checker has placed more than one item on the take-away belt 40. If so, the VPA 26 separates the items, and further processing is performed on each item individually, as described below.

"Blob" analysis is a well known image processing technique for determining the presence of multiple objects in an image. The technique is described in detail in Gonzalez and Woods, *Digital Image Processing*, pp. 41–43 (1992), which is hereby incorporated by reference. In the present embodiment, the VPA 26 is capable of identifying and separating up to two different items in an image. Essentially, the VPA 26 determines the centroids of the two largest "blobs" in an image in accordance with well known techniques. Once the centroids are identified, the equation of a line between the two centroids is computed and pixels along the line are examined to determine the largest gap of background pixels. A line is then calculated through the center of the largest gap and perpendicular to the line between the two centroids. If the pixels along this second line are substantially all background pixels (i.e., few or no pixels exceed the intensity threshold), the second line defines a line of separation between the two "blobs" or items, and the remaining process steps are performed separately for each of the items. If the pixels along the second line are not substantially all background pixels, additional lines at angles other than perpendicular to the first line are calculated. When a line is found that passes through mostly all background pixels, it is used as the line of separation between the items. If no such line of separation is found, the VPA 26 assumes that only a single item is in the field of view. It is understood that the item separation feature of the present invention may be extended to more than two items without deviating from the spirit and scope of the present invention.

Once an item has completely entered the field of view of the close-up lens, or multiple items have been identified and separated, a close-up color image of the take-away belt 40, including the item to be purchased, is acquired as shown at step 64. As mentioned above, in the present embodiment, the imaging device 14 acquires a digital color image comprising an array of pixels, each having a red component value (R), a green component value (G) and a blue component value (B). Next, at step 66, background pixels are removed from the image, leaving only the pixels that comprise an image of the item to be purchased. Background pixels are removed using the threshold intensities described above. That is, all pixels having an intensity below their respective threshold value are discarded.

With the background pixels removed, the remaining pixels comprise a color image of the item to be purchased. As explained above, in accordance with the present invention, data representing color features of the item to be purchased is generated from the image of the item in order to compare those color features to data representing expected color features for that item. Items bearing the same identification code should have the same color features. Unfortunately, external conditions can affect the perceived color of an item. One external condition that can affect the perceived color of an item is the color of illumination at a checkout station. Ideally, the color of illumination should be pure white (R=G=B). If this is not the case, the imaging device will not capture the true color of an item. For example, if the color of illumination is slightly yellow, colors throughout the item will appear more yellow than they would under an ideal, white source of illumination.

Variations due to differing color of illumination are compensated for in the present embodiment by first characterizing the illumination color and then normalizing the color information representing the item to be purchased. The illumination color is obtained by extracting the apparent color of a flat-white reference target which resides within the field of view of the imaging device. This information is then used to calculate the effect that the light source has on the item's appearance.

In general, the measured R, G and B values obtained from a particular camera can be expressed as follows:

$$R = R_I(d_R + s) \quad R_I = f_R G_I$$
$$G = G_I(d_G + s) \quad G_I = G_I$$
$$B = B_I(d_B + s) \quad B_I = f_B G_I$$

where:

R, G and B are the measured values of an image pixel;

$R_I$, $G_I$ and $B_I$ are the red, green and blue values of the source illumination;

$f_R$ is the ratio $R_I$ to $G_I$;

$f_B$ is the ratio of $B_I$ to $G_I$;

$G_I$ is arbitrarily chosen as the normal value of a color component of "white" light;

$d_R$, $d_G$ and $d_B$ are red, green and blue diffuse reflectances of the item at this pixel (ranges from 0 to 1); and s is the specular reflectance of the item at this pixel (ranges from 0 to 1).

In order to obtain normalized values for R, G, and B, it is necessary to determine the red, green and blue values that would have been obtained if $R_I=B_I=G_I$. Thus, $$R_C=G_I(d_R+s)$$
$$G_C=G_I(d_G+s)$$
$$B_C=G_I(d_B+s)$$

where $R_C$, $B_C$ and $G_C$ are corrected red, green and blue pixel values. Combining equations yields simplified equations for the corrected red, green and blue values:

$$R_C=R/f_R$$
$$G_C=G$$
$$B_C=B/f_B.$$

Values for $f_R$ and $f_B$ are obtained from the pixel values of the white target reference, and the measured R, G and B values obtained by each camera are then corrected in accordance with the foregoing equations, thereby removing any effects the color of illumination at the checkout station may have on the item's color features or appearance.

Another external condition that can affect the perceived color of an item is glare. Glare occurs when "white" illumination reflects from the surface of an item directly into the lens of the imaging device in a specular manner. However, even in the presence of glare, there will still be some diffuse reflection that has the true color of the underlying pigments of the item's surface. In some cases, glare will not affect the hue of the diffuse reflection, because the addition of "whiteness" (equal increases in R, G and B) does not affect hue. However, if the glare causes any one of the R, G, or B values to saturate, the proportions of these color components, and thus the hue, will be distorted. In the present embodiment, the effects of glare are minimized in step 64 by acquiring a first close-up color image as described above using a standard exposure time, and then immediately acquiring a second close-up color image using a very short exposure time. The short exposure time of the second image decreases the likelihood that any of the red, green or blue pixel values will saturate as a result of glare. Any saturated pixel values in the first image (long exposure) can be replaced with the corresponding pixel values in the second image (short exposure) to minimize the effects of glare in the first image.

It should further be noted that each imaging device 14 may vary in terms of gain, offset and linearity. Such variations are accounted for by characterizing the camera at the time of manufacture and recording the response of the device in the form of a look-up table for each of the color components red (R), green (G) and blue (B). At time of application, the software uses the look-up table to replace the output value of the camera with a normalized value that represents what the output of an ideal camera would be.

Figure 1A:
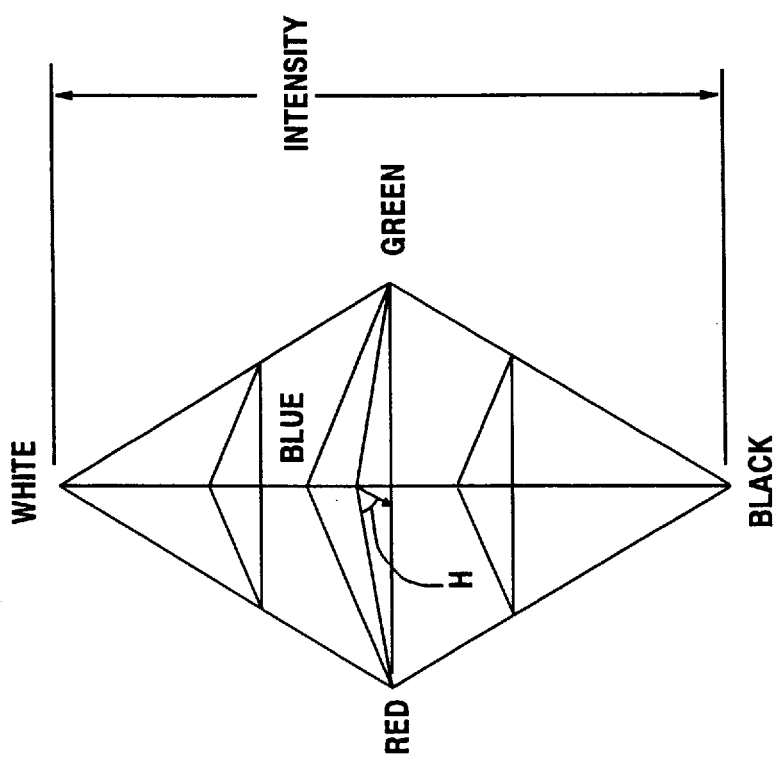

Having compensated for variations in the color of illumination, for variations in the response characteristics of individual imaging devices, and for the effects of glare, data representing color features of the item to be purchased can be generated from the corrected color pixel values of the image of the item. According to the preferred embodiment, the data representing color features of the item to be purchased is derived solely from hue. Saturation and intensity are presently not used. Hue is used as the sole measure of color because, as illustrated in FIGS. 1(a) and 1(b), it is inherently invariant to changes in intensity (e.g., shadows, uneven lighting etc.) and changes in saturation. From the corrected red (R), green (G) and blue (B) component values of each pixel in the close-up color image generated by the imaging device 14, the hue of each pixel is obtained as follows:

$$H = \text{TAN}^{-1}\left( \frac{2R - G - B}{\sqrt{3}\ (G - B)} \right).$$

As the equation indicates, hue is represented as an angle measurement ranging from 0° to 360°. It is understood that other equations for hue exist and may be employed to calculate hue. The present invention is by no means limited to use of the foregoing equation. Moreover, while in the preferred embodiment, data representing color features of an item to be purchased is derived from hue information in the image, in other embodiments the data representing color features of the item to be purchased can be derived from other color information in the image without deviation from the spirit and scope of the present invention. For example, the color feature data could be derived directly from the red, green and blue component values of each pixel, from a combination of hue, saturation and intensity, or from color information based on some other color model, such as CMY, YIQ, and the like.

As described below in greater detail, in the preferred embodiment, the data representing color features of the item to be purchased comprises a histogram having a plurality of bins, each bin representing a discrete range of hues and containing a value indicative of the frequency of that range of hues in the image of the item to be purchased. More specifically, each bin of the histogram contains a count of the number of pixels in the image of the item that fall within the range of hues represented by that bin. Essentially, the histogram represents a frequency distribution of hues displayed by the item under consideration. It is understood, however, that the term "color features" is in no way limited to the frequency distribution of hues presented by an item. Rather, the term "color features" is intended to encompass any features relating to the color(s) of an item. For example, the color features could be based on the relative areas of red, green and blue pixels, or on any other zero dimensional features of an item. Alternatively, the color features may be based on one dimensional features, such as color projection along a given axis, color projections along arbitrary axes and the like. Still further, the color features of an item can comprise any number of two-dimensional features, such as color texture, color occurrence distributions, edge color content, color blob analysis, segmented color features or other two-dimensional features. The appended claims are intended to encompass all such possibilities. Moreover, in the case of zero-dimensional color features, the data representing those color features is not limited to the form of a histogram to convey those features. Any other suitable data structure can be employed.

As the equation for hue further reveals, the equation has a singularity at R=G=B. A pixel whose R, G and B values are equal therefore has no defined color. Additionally, the equation for hue is extremely sensitive to changes in R, G and B when the values of R, G and B are approximately equal. Consequently, the slightest amount of noise can cause wide variations in the calculated hue when R, G and B are approximately equal. According to an important feature of the present invention, prior to generating a hue histogram from the color image of the item to be purchased, "colorless" pixels are segregated, or filtered, from the remaining color pixels of the image, as shown at step 68. A "colorless" pixel is defined herein as a pixel in which the values of R, G and B are so close (i.e., the color is so faint) that any hue value calculated from the R, G and B values of that pixel cannot be distinguished from noise introduced by the imaging device 14. Visually, a "colorless" pixel is one in which the color is so faint that it appears to be some variation of grey. Such pixels must be segregated, or filtered, from the image because they will produce arbitrary or erroneous hue values that will distort the data (i.e., histogram) representing the color features of the item under consideration.

In the preferred embodiment, "colorless" pixels are identified according to the following formula:

$$MAX(R,G,B)-MIN(R,G,B)<c(I)$$

where c(I) is a color threshold function that scales with intensity. Any pixel in which MAX(R,G,B)−MIN(R,G,B) falls below the color threshold is considered a "colorless" pixel. Because the left side of the inequality scales with intensity, the color threshold, c(I), must also vary with intensity.

To provide a color threshold that scales with intensity, multiple images of a white reference target were obtained with an imaging device 14 to measure the noise characteristics of the video subsystem (i.e., the imaging device 14, CAMCON 18, VSI 24 and VPA 26) at different intensity levels. The different intensity levels were achieved with grey-scale filters mounted over the lens of the imaging device 14. For each intensity (e.g., grey-scale filter), a color threshold is calculated from the R, G and B pixel values representing the white reference target as follows:

$$c(I)=\mu(I)+k\sigma(I)$$

where

I=R+G+B is intensity;

$\mu(I)$ is the mean of the R, G and B values of the pixels representing the white reference target at intensity I;

$\sigma(I)$ is the standard deviation of the R, G and B values of the pixels representing the white reference target at intensity I; and k is a constant that is adjusted empirically for best results. A value of k=4 has been found to produce satisfactory results during experimental uses of the system.

After identifying and segregating "colorless" pixels, the hue of each remaining pixel is determined as set forth above, and the counts in the appropriate bins of the histogram are incremented to reflect the number, or frequency, of pixels falling within the various ranges of hue represented by those bins. As such, the histogram provides a "visual signature" of the item to be purchased based on the frequency of hues displayed in the labeling and packaging of the item. Rather than completely ignoring "colorless" pixels, a count of the number of "colorless" pixels is maintained and appended as a separate bin to the histogram generated from the remaining color pixels.

Figure 5:
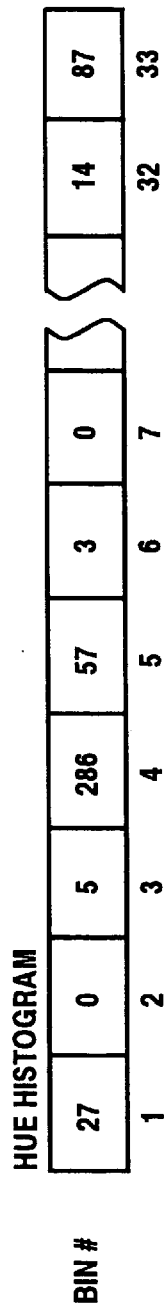
FIG. 5 is a graphical representation of an exemplary histogram containing data representative of color features derived from an image of an item to be purchased.

FIG. 5 graphically illustrates the contents and arrangement of a hue histogram in accordance with the preferred embodiment of the present invention. As shown, the histogram comprises thirty-three (33) bins, the first thirty-two bins representing successive sub-ranges of hue, and the thirty-third bin containing a count of the number of colorless pixels identified in the image of the item. In the present embodiment, each of the first thirty-two bins represents 11.25° of the total 360° range of hues. In the example shown, twenty-seven pixels fell within the sub-range of hues represented by bin #1, whereas two-hundred sixty-eight pixels fell within the sub-range of hues represented by bin #4. Eight-seven pixels were identified as being "colorless", i.e., the count in bin #33. The histogram can be implemented in software as a one-dimensional array having thirty three elements.

Because each bin of the histogram contains an actual pixel count, the sum of the counts in all bins of the histogram represents the surface area or size of the item under consideration, as viewed by the imaging device. Thus, the histogram inherently contains information representing surface area of the item. In other embodiments, this information can be removed from the histogram by dividing the count in each bin of the histogram by the sum of the counts in all bins. However, in the preferred embodiment, the area information is not removed from the histogram, because it provides an added characteristic for comparison to expected values.

Once the histogram representing color features of the item to be purchased has been generated at step 70, control passes to step 72 where the controller 22 consults the database entry for the identification code ascertained from the item under consideration (i.e., in step 60) to determine whether the system has gained sufficient knowledge of the color features of items bearing that identification code, i.e., whether sufficient data representing expected color features of the item has been generated and stored in the database. In the present embodiment, step 72 comprises examining the learning flag field of the database entry for the current identification code. If the learning flag indicates that the system does not have sufficient "knowledge" of the color features of the present item, then the system enters a learning process at step 76. The learning process is described hereinafter in greater detail. If, however, the learning flag indicates that the system does have sufficient knowledge of the expected color features of the present item, i.e., that data representing expected color features of items bearing the present identification code has been generated and stored in the database, then control passes to step 74.

At step 74, the controller 22 accesses the database using the identification code ascertained from the item under consideration (i.e., in step 60) and retrieves the data representing expected color features for items bearing that identification. The controller 22 then compares the histogram generated from the image of the item under consideration to the retrieved data. In the absence of fraudulent activity, the color features derived from the image of the item to be purchased should match, within acceptable tolerances, the expected color features for items having that identification code.

In the preferred embodiment, the data representing expected color features of an item comprises a set of N reference vectors. Each reference vector in the set represents a group, or cluster, of similar hue histograms derived from other, previously seen images of that item. Collectively, the set of reference vectors for a particular item (i.e., stock item in a store) comprises a statistical representation of the previously derived histograms. Preferably, the set of N reference vectors for a particular item comprises thirty (30) reference vectors (i.e., N=30). A plurality of reference vectors are needed for each item because the physical shape of an item can result in a number of different views when the item is placed on the take-away belt. For example, a rectangular box can be placed on any one of six sides, and therefore, six different views of that item are possible. The color features of the item may differ depending on which view of the item is being imaged. As described more fully below, the set of N reference vectors for each item is generated automatically in accordance with the learning process indicated at step 76 of FIG. 4.

Figure 6:
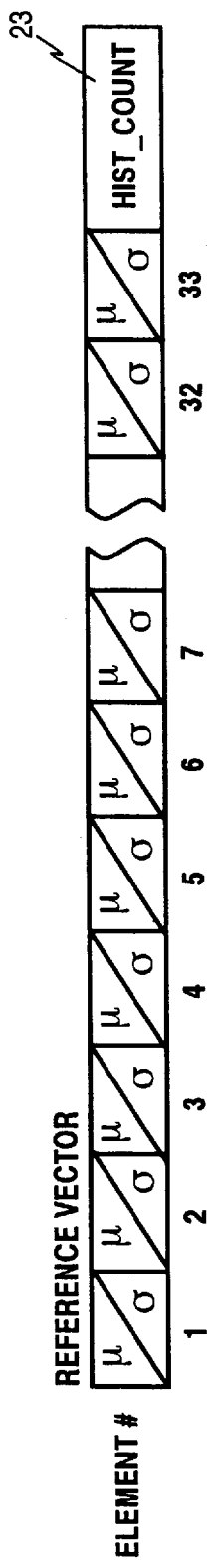
FIG. 6 is a graphical representation of a reference vector containing a statistical representation of expected color features of an item.

FIG. 6 illustrates the general content and arrangement of a single reference vector in accordance with the preferred embodiment of the present invention. As shown, the reference vector comprises a plurality of elements equal to the number of bins in a histogram derived from the image of an item to be purchased. Each element has a mean value component ($\mu$) and a standard deviation component ($\sigma$). The mean value component of a reference vector element represents the mean value of the corresponding bin of the histograms generated from other, previous images of the item. The standard deviation component of a reference vector element represents the standard deviation of the pixel counts in the corresponding bin of the previous histograms. An additional element 73 of the reference vector contains a count of the number of previous histograms from which the mean value and standard deviation components of that reference vector were derived.

For purposes of implementing a reference vector in software, and to facilitate combination of a reference vector with additional histograms or another reference vector, the mean value and standard deviation components of the reference vector do not contain actual mean and standard deviation values. Rather, the mean value component contains a sum of the corresponding bin from each of the histograms used to derive the reference vector, and the standard deviation component contains a sum of the squares of those bins. Actual values for the mean and standard deviation are then calculated using the respective sums and the value in the last element 73 of the reference vector, i.e., the count of the number of histograms included in the two summations. By way of example, a reference vector can be defined in the C-language as follows:

```
#define VECTOR_SIZE    33
struct reference_vector_struct {
    float sum_hist[VECTOR_SIZE];    /* mean value component */
    float sum_square[VECTOR_SIZE];  /* stndrd dev component */
    int   hist_count;               /* total # of histograms */
};                                  (element 73, Fig. 6)
```

Using this data structure, the mean value of the ith element of a particular reference vector can be calculated as follows:

$$\text{mean value} = \frac{\text{sum\_hist}[i]}{\text{hist\_count}}$$

Similarly, the standard deviation value of the ith element of the reference vector can be calculated as follows:

$$\text{standard deviation} = \sqrt{\left(\frac{\text{sum\_square}[i]}{\text{hist\_count}}\right) - \left(\frac{\text{sum\_hist}[i]}{\text{hist\_count}}\right)^2}$$

As can be appreciated, an additional item histogram can be added to an existing reference vector simply by (i) adding the value in each bin of the histogram to the sum_hist value of the corresponding reference vector element, (ii) adding the square of each histogram bin to the corresponding sum_square values, and (iii) incrementing the hist_count value to reflect the inclusion of the additional histogram values in the respective summations.

Referring again to FIG. 4, comparison at step 74 of the item histogram to the data representing expected color features of the item, i.e., the set of N reference vectors correlated in the database with the identification code ascertained from the item, is performed as follows. First, the controller 22 obtains a measure of difference between the item histogram and each of the N reference vectors. In the preferred embodiment, the measure of difference between the histogram and a reference vector can be expressed as follows:

where

D is the measure of difference;

$$D = \sum_{i=1}^{M} \frac{|h_i - \mu_i|}{\sigma_i}$$

$h_i$ is the value in the ith bin of the histogram;

$\mu i$ is the mean value component of the ith element of the reference vector; and $\sigma i$ is the standard deviation component of the ith reference vector element.

As can be appreciated from the foregoing equation, and in accordance with an important feature of the present invention, the measure of difference between the histogram and a reference vector scales with standard deviation.

Some bins of some item histograms can be expected to have large variations. For example, a loose bag of vegetables can present different color distributions depending on how much of a color is occluded by folds in the bag. As a result, the corresponding bins of histograms generated from different images of that item will display large variations. Such large variations will be reflected in the standard deviation components of the corresponding elements of a reference vector generated from those histograms. According to an important feature of the present invention, as embodied in the foregoing equation, the measure of difference between the current histogram and a reference vector generated from previous histograms of that item is normalized, or scaled, with standard deviation. Specifically, each absolute value difference term of the summation (i.e., $|h_i-\mu_i|$) is divided by the respective standard deviation component of the reference vector. Essentially, use of the foregoing difference measure in accordance with the present invention allows larger differences between the bin of a histogram and the mean value component of the corresponding reference vector element to be tolerated if the variation, or standard deviation, of the reference vector element is large. It is understood, however, that the present invention is not limited to the particular difference measure described above. Rather, any measure of difference that scales with variation or standard deviation may be employed. For example, the sum of the squares of these difference terms (i.e., $|h_i-\mu_i|^2/\sigma_i^2$, for i=1 to M) could also be used as a difference measure.

After determining a measure of difference for each of the reference vectors in the retrieved set, the controller 22 next identifies the reference vector that produced the smallest measure of difference, and then records that smallest measure of difference. Finally, in addition to recording the smallest measure of difference, the controller 22 also records the largest difference term obtained during the computation of that smallest measure of difference. That is, the controller 22 records the largest value of $|h_i-\mu_i|/\sigma_i$.

Next, at step 78, the maximum distance term recorded during computation of the smallest measure of difference is compared to a first threshold value. If the recorded maximum distance term exceeds the first threshold value, then control passes to step 80 and the system reports a mismatch between the color features derived from the image of the item to be purchased and the expected color features associated with the identification code ascertained from the item. Preferably, the controller 22 will display an alert on the video monitor 28 coupled to the controller 22. A supervisory employee can then review the transaction to determine the cause of the discrepancy.

If, however, the recorded maximum distance term does not exceed the first threshold value, then control passes to step 82 where the controller 22 compares the recorded smallest measure of difference to a second threshold valve. If the smallest measure of difference exceeds the second threshold value, then control passes to step 80 and a mismatch is reported as described above.

If, however, the smallest measure of difference does not exceed the threshold value, then control passes to step 84 where the controller 22 generates an indication that the color features of the current item match the expected color features for items bearing the same identification code. The indication generated in step 84 may take any form. For example, the controller 22 simply may cause the POS terminal 44 at the checkout station to beep. Both the first and second threshold values employed in steps 78 and 82, respectively, should be adjusted empirically to achieve system goals of greater than 99.9%. accuracy in reporting verification of a transaction and greater than 95% in reporting a mismatch. First and second threshold values of 2.0 and 0.4, respectively, have provided satisfactory results during experimental uses of the system.

After reporting that a transaction has been verified, i.e., that the identification code affixed to the item to be purchased is the correct code for that item, control passes to step 86 which comprises an aspect of the system's continuous learning capabilities. At step 86, the histogram generated from the image of the purchased item is combined with the reference vector that produced the smallest measure of difference in step 72. Specifically, the values in each bin of the histogram are added to the mean value and standard deviation components of the corresponding reference vector elements (in the manner described above), and the histogram count (i.e., hist_count) at the end of the reference vector is incremented to reflect the addition of the new histogram to these statistics. In this manner, the statistical representations of the color features of each item (i.e., the set of N reference vectors) can be refined each time that item is purchased.

According to another feature of the present invention, in addition to providing an audible or visual alert when a mismatch occurs (i.e., step 80), the system 10 is also capable of recording a series of video images surrounding the transaction in question. In the preferred embodiment, the VPA 26 continuously stores at least eight (8) seconds of monochrome overview images. When a mismatch is reported at step 80, the monochrome overview images obtained during the eight (8) seconds preceding the reported mismatch are stored. A supervisory employee can later review the eight seconds of stored video for the reported mismatch. Additionally, the VPA 26 can store at least one color close-up image of the take-away belt at the time the mismatch is reported.

By focusing on color features of items to be purchased, the present invention is better able to distinguish between different items than prior art systems that rely solely on product weight and/or shape. It is understood, however, that other physical characteristics can be compared in addition to color features in order to enhance accuracy, without deviating from the spirit and scope of the present invention. Indeed, because each item histogram in the present embodiment inherently contains information representing the surface area of the item, the comparisons performed at step 74 inherently also reflect a comparison between measured and expected area characteristics.

In a most preferred embodiment, the height sensors 16 at each station 12 are used to measure the height of an item to be purchased. The measured height can then be compared to data representing the expected height of an item to increase the identification accuracy of the system. Height comparison will also enable the system to thwart attempts by an unscrupulous checker to place one item directly on top of another item, while only scanning the top item.

The learning process indicated at step 76 of FIG. 4 will now be described in greater detail with reference to FIG. 7. Because the number of different items in a typical retail inventory (e.g., 30,000+ items in a typical supermarket), it is not feasible to generate a set of reference vectors for each stock item prior to actual use of the system in a retail environment. Accordingly, the system 10 of the present invention has the capability of "learning" an item's color features during actual use of the system, i.e., the system 10 is capable of generating a set of reference vectors for a particular item automatically. Essentially, the color features of each item are "learned" from successive images of that item.

Figure 7:
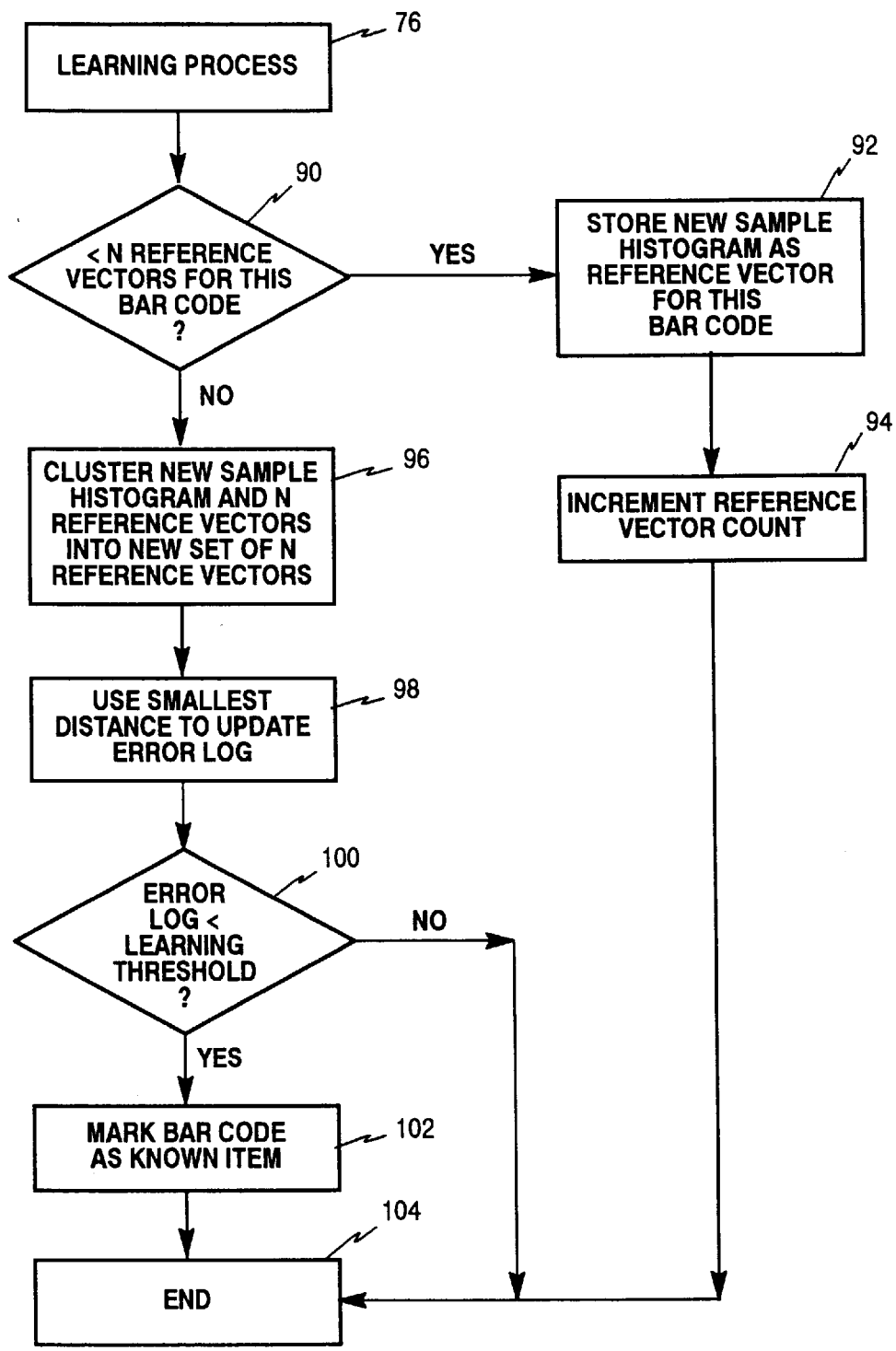
FIG. 7 is a flow diagram illustrating a learning feature of the system of FIG. 2.

FIG. 7 is a flow diagram illustrating the steps of the learning process in accordance with the preferred embodiment of the present invention. As mentioned above, the database entry for each unique identification code contains a learning flag field that indicates whether an adequate set of reference vectors has been constructed for items bearing that identification code. The controller 22 examines this flag in step 72 (FIG. 4) to determine whether an adequate set of reference vectors has been constructed for that identification code, i.e., whether the system has "learned" the color features of item's bearing that identification code. If the flag indicates that the system has not gained sufficient knowledge of the color features of the item under consideration, then the controller 22 enters the learning process at step 76.

Referring now to FIG. 7, upon entering the learning process, control passes immediately to step 90 where the controller 22 determines whether an initial set of N reference vectors has been constructed. Until the system has seen at least N images of the item under consideration, control passes directly to step 92 where the histogram generated from the current image of the item (step 70 of FIG. 4) is used to create a new reference vector. The values in each bin of the current histogram are used as the mean values for the respective elements of the new reference vector. However, because only a single histogram is being used to create the new reference vector, the standard deviation will be zero. Moreover, because the equation for obtaining a measure of difference between a reference vector and a subsequent histogram uses the standard deviation as a divisor, a zero value is unacceptable. Accordingly, whenever the hist_count element of a reference vector has a value of "1", the standard deviation value for each element of the reference vector is calculated or "initialized" in accordance with the following equation:

| standard deviation | = | (sum_hist[i] * a) + (log(sum_hist[i] + 1) * b) |
|---|---|---|

With appropriate values for 'a' and 'b', the equation generates a small positive value based on measured noise characteristics of the system 10. The equation was derived by placing an object on the take-away belt of a checkout counter 12, acquiring one-hundred successive images of the object and then generating a hue histogram from each image. The standard deviation of each histogram bin was then plotted against the size of the bin. The plot revealed logarithmic and linear sources of noise, both of which are reflected in the equation. Experimental values of a=0.008 and b=4 have produced satisfactory results during experimental uses of the system.

After generating a new reference vector, a reference vector count (which may be part of the record in the item database) is incremented to reflect the addition of the new reference vector for the current identification code. The controller 22 then exits the learning mode at step 104. However, until the reference vector count reaches N, each time an item bearing that identification code is processed by the system, the controller will enter the learning mode at step 76 and perform steps 90–94, creating a new reference vector each time in the manner described above. Once the initial N reference vectors have been created, the condition tested in step 90 will be satisfied. However, this does not mean that the system has "learned" the color features of items bearing that identification code. Rather, the learning process begins refining the initial N reference vectors until a threshold learning criterion is satisfied, as described below.

In particular, once the initial N reference vectors have been created for a particular identification code, the next time an item bearing that identification code is processed by the system in accordance with steps 60–72, the controller 22 will again enter the learning mode at step 76. However, this time, the condition at step 90 will be satisfied and control will pass to step 96. At step 96, the controller 22 "clusters" the new item histogram with the N reference vectors already created for the identification code associated with that item, to create a new set of N reference vectors.

In the preferred embodiment, the new histogram is clustered with the existing N reference vectors in the following manner. First, a new reference vector is generating from the new item histogram (as in step 92), thereby creating a total of N+1 reference vectors. Next, the closest two of the N+1 reference vectors are identified by obtaining a measure of difference between each possible pair of reference vectors in the set. In the present embodiment, the measure of difference between two reference vectors is calculated in a manner similar to that employed to compare an item histogram to a reference vector. Specifically, the measure of difference, $D_{RF}$, between the xth and yth reference vectors in the set of N+1 reference vectors is obtained as follows:

$$D_{RF} = \sum_{i=1}^{M} \frac{|\mu_{i_x} - \mu_{i_y}|}{\text{MAX}(\sigma_{i_x}, \sigma_{i_y})}$$

where,

M is the number of elements in a reference vector;

$\mu_{i_x}$ and $\mu_{i_y}$ are the respective mean values of the ith element of each reference vector; and $\sigma_{i_x}$ and $\sigma_{i_y}$ are the respective standard deviation values of the ith element of each reference vector.

Essentially, the mean values of each element are subtracted and then divided by the largest of the two standard deviations. The results for each element are then summed to produce the measure of difference.

After determining a measure of difference for each possible pair of reference vectors in the current set, the pair of reference vectors producing the smallest measure of difference are combined to form a single reference vector. The combination of the closest two reference vectors reduces the total number of reference vectors back to N. With the preferred reference vector data structure described above, the corresponding element values of each reference vector, including the hist_count values, can simply be added to form the single, combined reference vector.

Next, at step 98, the smallest measure of difference generated in step 96 (i.e., the measure of difference between the closest two reference vectors) is used to update an error log representing the quality of the system's knowledge of the color features of the item under consideration. In the present embodiment, the error log comprises the last ten smallest difference measures obtained in step 96 for the item under consideration. Although a log of the last ten smallest difference measures is preferable, in other embodiments, the log may include greater or fewer of the previous difference measures.

At step 100, each difference measure of the error log is compared to a learning threshold value. If any value in the log exceeds the threshold value, the system 10 does not have sufficient "knowledge" of the item's color features, and processing of the current item is complete. Upon subsequent processing of items bearing the same identification code, the system will again enter the learning mode and perform steps 96–100. This will continue until the error log satisfies the learning threshold. As can be appreciated, the learning process described above allows the color features of particular items to be learned by the system during actual use, i.e., the learning process is unsupervised. Such an unsupervised learning process avoids the need for a system operator to build the item database prior to actual use of the system, which would be impractical in the case of a supermarket containing over 30,000 items.

When the error log eventually satisfies the threshold value in step 100, the system is considered to have sufficient "knowledge" of the color features of the item under consideration, and the learning flag associated with the item's identification code in the database is set to indicate that the item's color features have been "learned". As a result, the controller 22 will no longer enter the learning mode for items bearing that identification code. Rather, subsequent purchases of items bearing that identification code will be verified as described above (i.e., steps 74–88 of FIG. 4).

The system 10 is capable of handling a number of exceptional transactions. For example, the controller 22 allows hand-carried items to be passed directly to the customer without being processed in the manner described above. These items are coded as such in the "handling status" field of the item database. When such items are purchased, the verification process described above is disabled. Purchase of items that are too large to be placed on the take-away belt can be verified by placing a bright sticker on the item prior to the customer entering the cart aisle. When the customer passes through the cart aisle, successive images of the cart aisle can be processed to verify the presence of the bright sticker. Finally, the system must be sensitive to situations in which, as a result of certain merchandising techniques, the same UPC number is assigned to more than one discrete item. For example, the same UPC code is sometimes used on different package sizes of the same item. Additionally, a "clearance" or "markdown" UPC code is sometimes used to mark a variety of items with the same price point for clearance purposes. These items can be identified as such in the item database.

Figure 8:
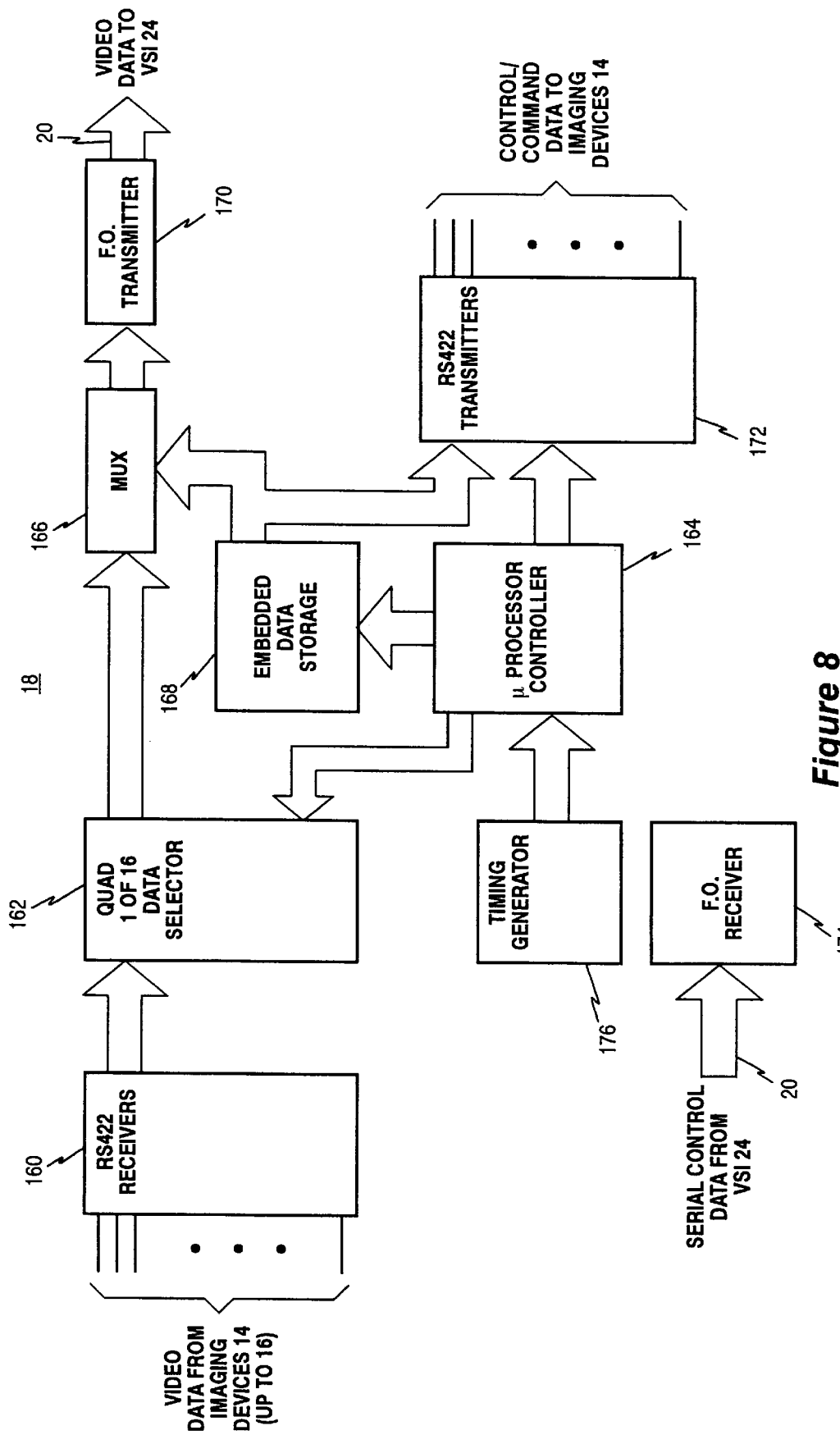
FIG. 8 is a block diagram illustrating further details of the CAMCON of FIG. 2.

FIG. 8 is a block diagram illustrating further details of the CAMCON 18 of FIG. 2. The CAMCON 18 is a microprocessor controlled digital video multiplexer. Digital video data from each imaging device 14 is transmitted to the CAMCON 18 over a shielded, twisted-pair cable as an RS-422 compliant signal. A bank of RS-422 receivers 160 receive the video data from each imaging device 14 and provide the data to a quad 1-of-16 data selector 162. A microprocessor/controller 164 controls the output of the data selector 162 and provides the video data from selected imaging devices 14 to a time-division multiplexer 166. Supplemental data stored in an embedded data storage 168 is also provided to the multiplexer 166. The supplemental data may include image-related information, the serial numbers of selected imaging devices, data and time references and height information generated by the height sensors 16 at each station 12. The supplemental data is multiplexed with the outgoing video data at appropriate times. A fiber-optic transmitter 170 converts the parallel data output of the multiplexer 166 to serial data and transmits the outgoing data to the VSI 24 over the fiber-optic link 20 at a rate of 14.318 MHz.

A fiber-optic receiver 174 receives serial control and command data transmitted over the fiber-optic link from the VSI 24. As explained hereinafter, the serial control data originates from various signal processors of the VPA 26 and passes through the VSI 24 which controls access to the CAMCON 18 by the various signal processors. The microprocessor 164 interprets the control data from the VSI 24 and provides appropriate command data to the respective imaging devices 14 via RS-422 transmitters 172. A timing generator 176 controls overall timing of the video system.

Figure 9:
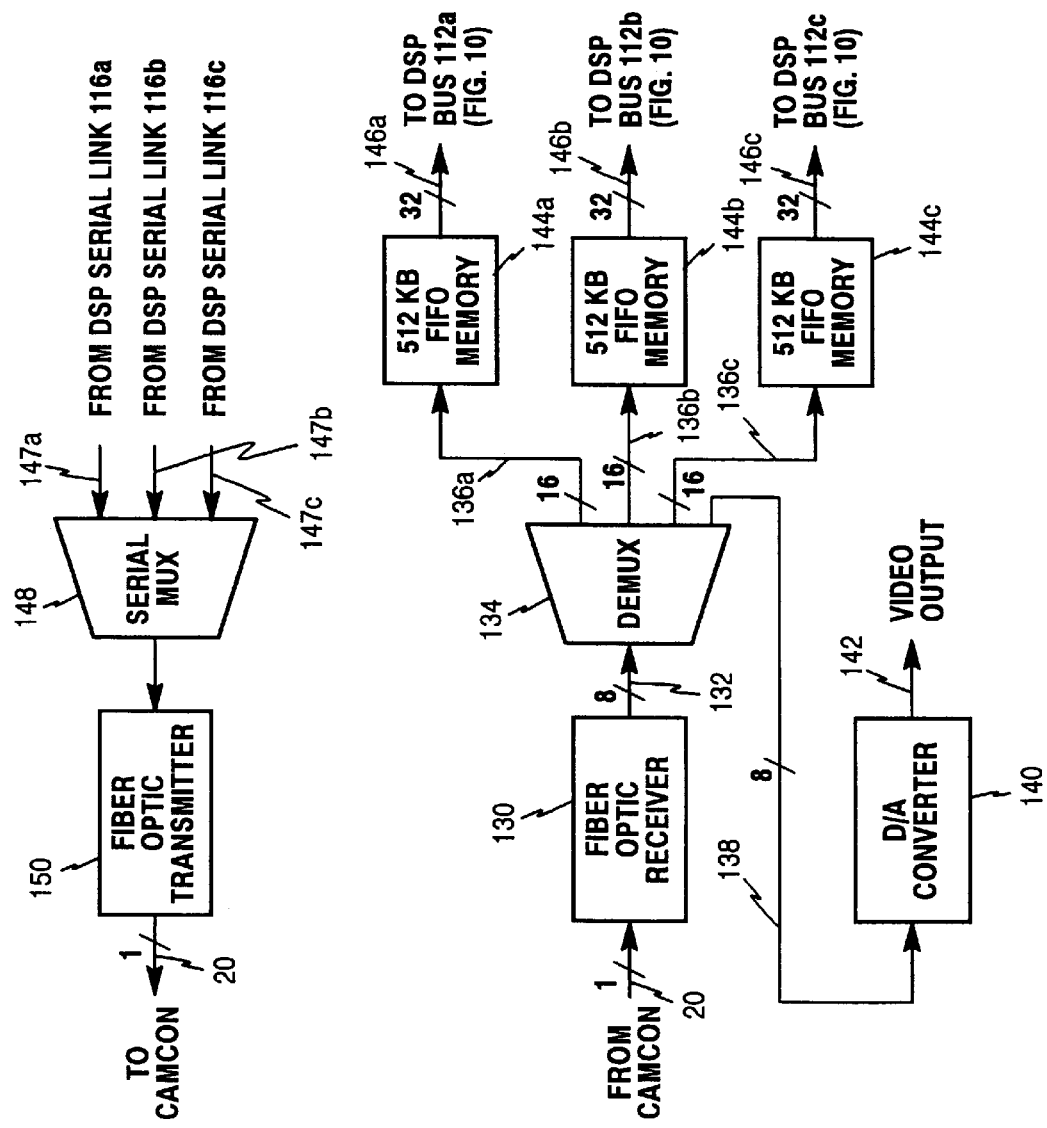
FIG. 9 is a block diagram illustrating further details of the VSI of FIG. 2.

FIG. 9 is a block diagram illustrating further details of the VSI 24 of FIG. 2. As shown, the VSI comprises a fiber-optic receiver 130 for receiving the multiplexed video data from the CAMCON 18 over the two-way optical fiber link 20. The multiplexed video data is provided via line 132 to a demultiplexer 134 that demultiplexes the video data. Video data representing monochrome overview image frames is provided via line 136a to a first FIFO memory 144a. Video data representing color close-up image frames is provided via line 136b to a second FIFO memory 144b, and video data representing monochrome close-up image frames is provided to a third FIFO memory 144c via line 136c. Preferably, each FIFO memory 144a,b,c comprises 512 kilobytes of storage. Full motion video data from a selected checkout station may be demultiplexed and provided via line 138 to a digital-to-analog converter 140 for immediate output on any NTSC display device, or recorded on a video cassette recorder (VCR).

As explained hereinafter, the VPA 26 comprises three digital signal processors, one for processing monochrome overview image frames, one for processing color close-up image frames, and one for processing monochrome close-up image frames. Each of the FIFO memories 144a, 144b, 144c is coupled to a respective one of the digital signal processors of the VPA 26 via lines 146a, 146b and 146c, respectively. Monochrome overview images stored in the first FIFO memory 144a are output on line 146a; color close-up images stored in the second FIFO memory 144b are output on line 146b, and monochrome close-up images stored in the third FIFO memory 144c are output on line 146c. Serial control data intended for the CAMCON 18 is received by the VSI 24 from the digital signal processors on respective lines 147a, 147b and 147c. The serial control data from each digital signal processor is fed to a multiplexer 148. The VSI 24 arbitrates access to the CAMCON 18 by controlling the multiplexer 148. The serial control data from a selected processor is output from the multiplexer 148 to a fiber-optic transmitter 150 which transmits the control data to the CAMCON 18 via the two-way fiber optic link 20.

Figure 10:
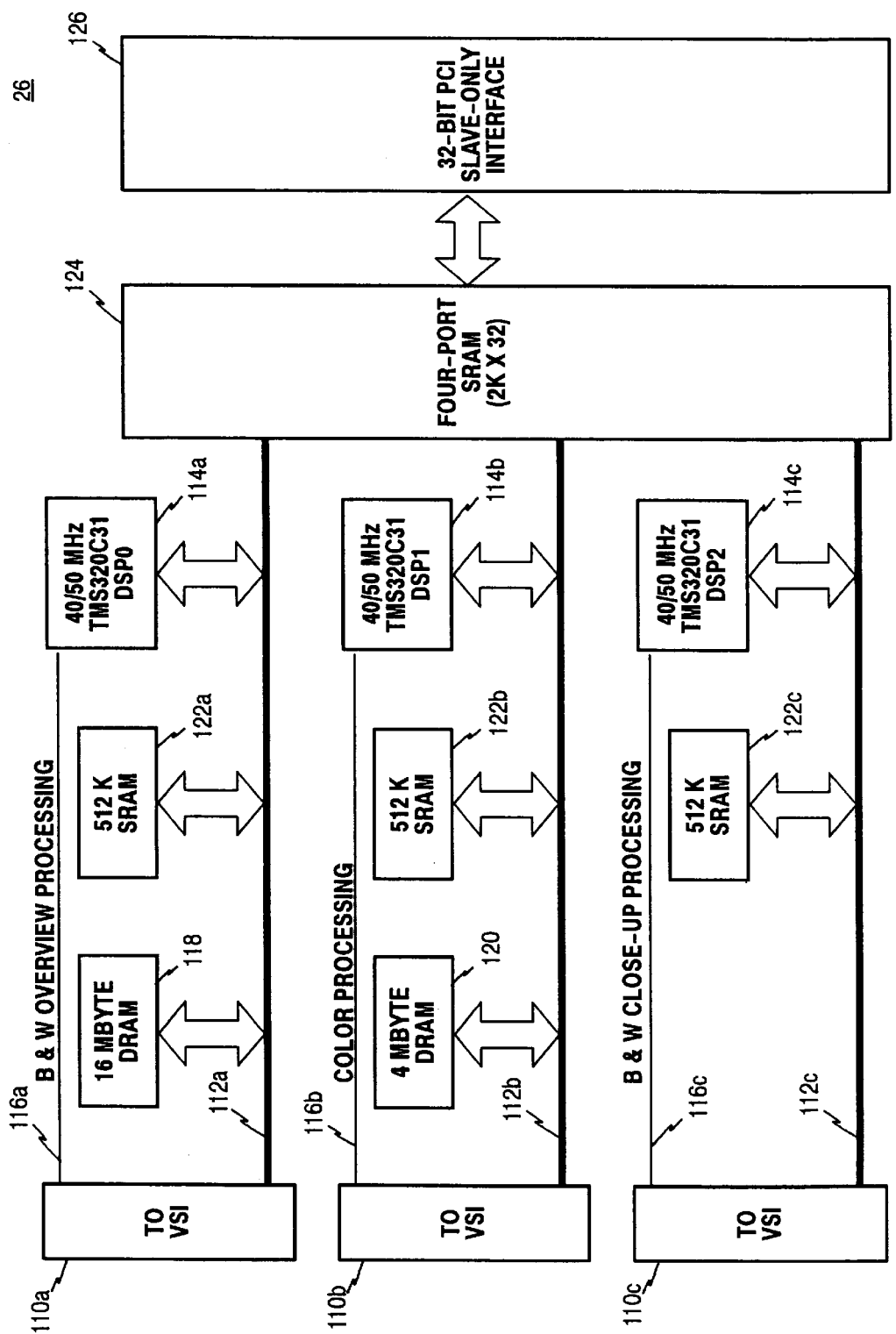
FIG. 10 is a block diagram illustrating further details of the VPA of FIG. 2.

FIG. 10 is a block diagram illustrating further details of the VPA 26 of FIG. 2. As shown, the VPA comprises first, second and third digital signal processors (DSP) 114a, 114b, and 114c. Preferably, each digital signal processor comprises a Texas Instruments TMS320C31 processor operating at 40/50 MHz, although any suitable digital signal processor can be employed. The first DSP 114a processes monochrome overview images received from the VSI 24 on bus 112a, the second DSP 114b processes color close-up images received from the VSI 24 on bus 112b, and the third DSP 114c processes monochrome close-up images received from the VSI 24 on bus 112c.

As further shown, each DSP 114a,b,c is coupled to a respective 512 kilobyte static random-access memory (SRAM) 122a,b,c. Additionally, the first DSP 114a is coupled to a 16 megabyte dynamic random-access memory (DRAM) 118, and the second DSP 114b is coupled to a 4 megabyte DRAM 120. The DSPs 114a,b,c output serial control data to the VSI 24 on respective lines 116a, 116b and 116c. Control lines 116a,b,c and buses 112a,b,c are coupled to the corresponding lines of the VSI 24 though respective connectors 110a,b,c. Each of the DSPs 114a,b,c is coupled to a four-port SRAM 124 through its respective bus 112a, b,c. The four-port SRAM 124 serves as a buffer between the DSPs 114a,b,c and a PCI interface 126 through which the VPA 26 communicates with the controller 22.

Each of the DSPs 114a,b,c may be used to perform selected steps of the method illustrated in FIG. 4. For example, in the present embodiment, the third DSP 114c performs steps 61, 62 and 66 (i.e., item tracking, blob analysis and background removal). The second DSP 114b performs steps 68 and 70 (i.e., segregation of colorless pixels and generation of hue histograms). The first DSP 114a can be used to store overview images for subsequent review in the event a mismatch is reported.

As discussed above in the Summary Of The Invention section of this specification, another security feature of the present invention provides a mechanism whereby the system detects when a shopper attempts to pass through the checkout aisle with an item in his or her shopping cart, without paying for the item. A presently preferred embodiment of this system performs the following steps:

1. The system records the presence of an item in the shopping cart.
2. The item database specifies the permitted handling of the item, including identifying "large" items that may remain in the cart.
3. The system handles "large" items that are too large for the take away belt by checking for an item designated as "large" in the transaction. If such an item is in the transaction, a non-empty cart will be permitted.
4. The system detects the situation where a nonempty cart is in the checkout aisle with no "large" item in the current transaction. Such a situation could indicate that the customer is attempting to leave the premises without paying for the item in the cart. (The customer could be working alone or in conjunction with the cashier. Therefore, it is not sufficient to simply rely on the cashier to inspect the shopping cart for items for which payment has not been received.)

To perform the foregoing functions, the system must:
1. Learn the appearance of empty carts.
2. Locate carts within the cart aisle.
3. Identify whether the cart is empty or not.
4. Designate items as "large" in the item database.
5. Detect items designated as "large" in the transaction.
6. Generate certain events (such as an alarm) when a non-empty cart is detected and no "large" items are in the current transaction.

Figure 11:
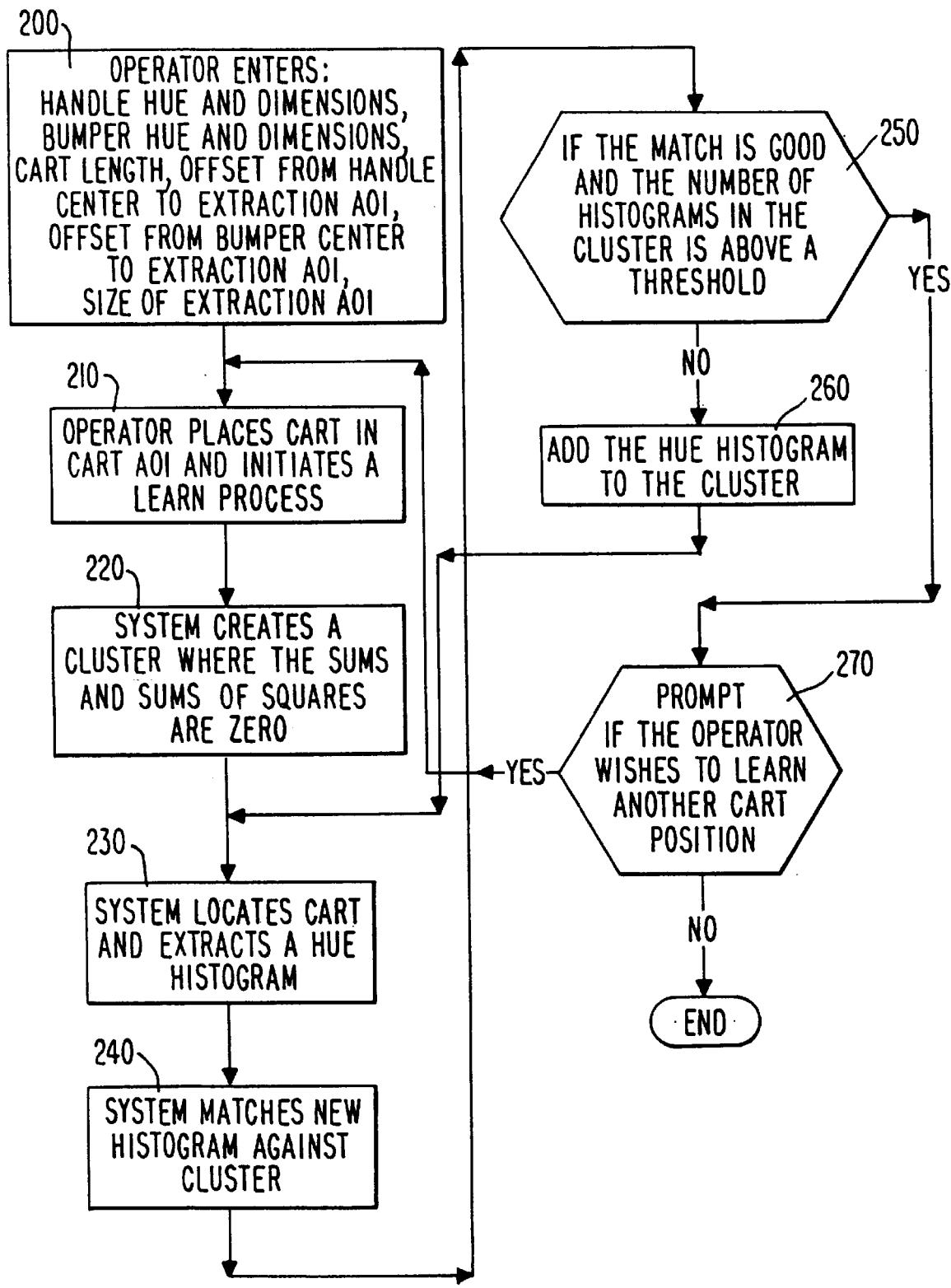
FIGS. 11 and 12 are flowcharts of cart learning and empty cart methods, respectively, in accordance with another aspect of the present invention.

The cart learning process is described generally by the flowchart of FIG. 11. Before discussing the flowchart, the input data employed to perform the Lane Configuration function will be described.

1. Description of cart types. Highly reflective, or other easily identifiable, strips are affixed to the handle and bumper of a cart representative of each cart type. The required data for each cart type will include handle hue and dimensions, bumper hue and dimensions, cart length, offset from handle center to extraction area of interest (AOI), offset from bumper center to extraction AOI, and size of extraction AOI.

2. Empty cart clusters. The operator is prompted for the cart type. The operator will then place the cart in a position and learn a cluster. When the cluster is learned, the operator will be permitted to move the cart to a different position and to learn a new cluster. The video processing accelerator (VPA), which in the preferred embodiment includes a board containing three digital signal processors and approximately 20 MB of memory to store images, employs the cart description data to locate the cart and extract a signature. The resulting signature is then added to the cluster for that cart type in that lane.

Referring now to the flowchart of FIG. 11, the following steps are performed:

Step 200—Operator enters: handle hue and dimensions, bumper hue and dimensions, cart length, offset from handle center to extraction AOI, offset from bumper center to extraction AOI, size of extraction AOI.

Step 210—Operator places cart in cart AOI and initiates a learn process.

Step 220—System creates a cluster where the sums and sums of squares are zero.

Step 230—System locates cart and extracts a hue histogram.

Step 240—System matches new histogram against cluster. If the match is good and the number of histograms in the cluster is above a threshold (e.g., 50), go to Step 270.

Step 260—Add the hue histogram to the cluster and go to Step 230.

Step 270—Prompt if the operator wishes to learn another cart position. If yes, go to Step 220. If no, learn is done.

As indicated above, the vision method used requires that the cart be modified to have a brightly colored handle and a brightly colored bumper across the front of the cart. These colors should be in high contrast to the floor color. The handle and bumper should appear to be at least one inch wide from the ceiling.

The vision hardware is configured to send one color overview snapshot to the VPA every second from each active lane. The color overview processor is responsible for locating the cart.

The vision system locates the cart by looking for the handle and, if not found, looks for the front bumper. In the case of the handle, the vision system looks in the image for transitions from colors that are not the handle color to the handle color. A list of these transitions is kept. Transitions that do not appear in pairs the width of the handle apart are deleted. The first point in each pair is least-squares fit to a line. If the sum squared error (SSE) of this fit is too high, the point that contributes the most to the SSE is deleted. The fit and delete steps are repeated until the sum squared error is sufficiently low or there are too few points left to continue. If the fit is successful, the handle is assumed to be found. In addition, the full length of the handle must be found so that the center of the handle can be accurately computed. The identical algorithm is used to locate the bumper.

If either the handle or the bumper is found, the location of the cart will be assumed from that information. The offset from the handle or bumper is used to determine the location of the extraction AOI. A hue histogram is extracted from the AOI and sent to the CPA host for learning or comparison.

The system can be fooled in the following ways:
1. Both the handle and the bumper are covered. The front may have a jacket over it and the handle might have a pocketbook on it. In this case, the cart would not be seen by the system and so no cart aisle events could be generated.
2. The cart is put through backwards. The system would assume that the cart was in front of the handle or behind the bumper and be wrong. A false event could be generated.

Figure 12:
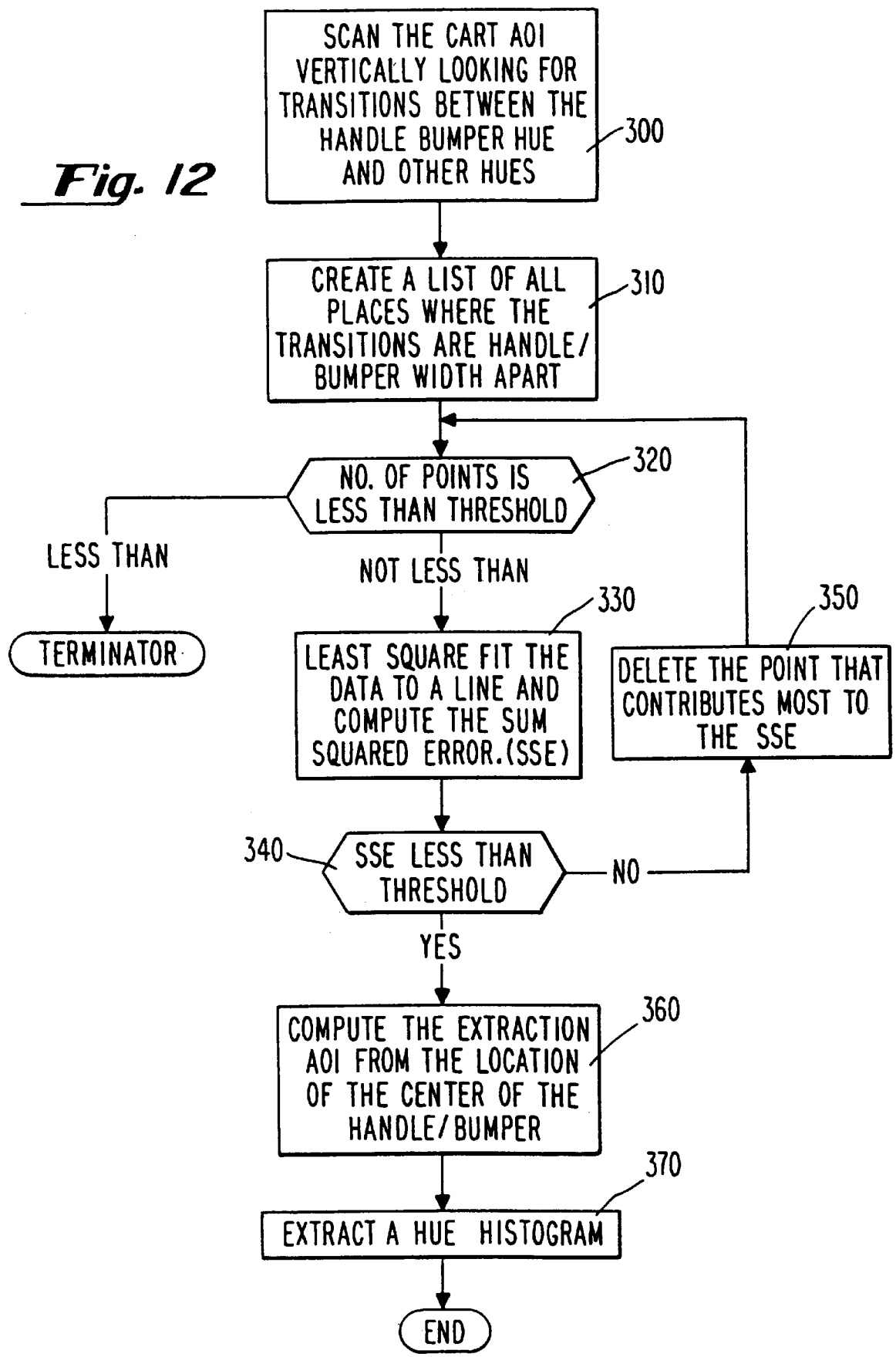

Referring now to FIG. 12, the steps of the cart location method will now be described:

Step 300—Scan the cart AOI vertically looking for transitions from the handle/bumper hue and other hues.

Step 310—Create a list of all places where the transitions are handle/bumper width apart.

Step 320—If the number of points is below a threshold (e.g., 7), handle/bumper was not found. Stop.

Step 330—Least squares fit the data to a line and compute the sum squared error (SSE).

Step 340—If the SSE is below a threshold (e.g., 1.0), go to Step 360.

Step 350—Delete the point that contributes most to the SSE and go to Step 320.

Step 360—Compute the extraction AOI from the location of the center of the handle/bumper.

Step 370—Extract a hue histogram.

Once the handle or bumper has been located, an area of interest that covers the bottom of the cart basket but does not include the child seat is defined. A hue histogram of that area (i.e., signature) is extracted from that area. This signature is compared with the signatures of all the empty cart types for that lane. If the signature matched one of these (match threshold is e.g., 1.0), the cart is assumed to be empty.

The mathematics of the signature comparison method is the same as that used in the item comparison with the following exceptions:

1. Hue bins with significant area (e.g., more than 2% of the extraction AOI) in the learned cluster are ignored in the computation.
2. Hue bins with insignificant area (e.g., less than 0.5% of the extraction AOI) in both the learned cluster and the histogram being compared are ignored in the computation.
3. The resulting score is the maximum bin difference from the remaining bins.

When a cartable item is scanned and left in a cart, an "Item scanned but not seen" event will occur. The CPA GUI will allow the manager to dispose of this event by designating the item as "cartable." This would cause this item to be labeled as "large" in the item database.

The system will detect if any item in the transaction has a "large" designation in the item database. When this is detected, non-empty carts will not cause events. "Large" items will not be learned. If a "large" item is not scanned and put down the belt, a signature will arrive that does not match any scanned item. When the signature times out, if a "large" item was scanned, the signature will be checked to see if the item is more than 125 square inches. If it is, it will be assumed that the "large" item went down the belt. If not, an "item seen but not scanned" event will be generated.

An event will only be generated if a cart is found to be not empty and the transaction contains no item designated as "large."

As the foregoing illustrates, the present invention is directed to systems and methods that employ machine vision and object recognition techniques for preventing fraud in retail check-out environments. More particularly, the present invention is directed to a system and method for verifying the purchase of items in such environments. It is understood that changes may be made to the embodiments described above without departing from the broad inventive concepts thereof. Accordingly, the present invention is not limited to the particular embodiments disclosed, but is intended to cover all modifications that are within the spirit and scope of the invention as defined by the appended claims.

What is claimed is:

1. A method for use in preventing fraud in a retail or like environment in which customers utilize carts to bring items to be purchased to a checkout station having a cart aisle through which the carts pass, said method comprising the steps of:

(a) providing empty cart image data representing at least one image of a cart that is known to be empty;

(b) when a customer arrives at said checkout station with a cart to perform a transaction for the purchase of selected items, obtaining an image of said customer cart;

(c) comparing the image of said customer cart to said empty cart image data, and determining from said comparison whether said customer cart is empty; wherein said items to be purchased have identifying codes associated with them, said method further comprising the steps of:

detecting the codes associated with items to be purchased in said transaction as said items are removed from said customer cart;

if said cart is determined not to be empty, determining whether a code has been detected for an item that is permitted to be in the cart; and if no code is detected for an item that is permitted to be in the cart, initiating an action to deter a possible attempt by the customer to leave the premises without paying for an item in the cart.

2. The method recited in claim 1 further comprising the steps of:

(i) if said customer cart is determined not to be empty, determining whether the non-empty cart is permitted for said transaction; and (ii) if said non-empty cart is not permitted for said transaction, initiating an action to deter a possible attempt by the customer to leave the premises without paying for an item in the cart.

3. The method recited in claim 1 wherein an optically discernable strip is affixed at a predetermined location on said customer cart, and wherein the step of obtaining an image of said customer cart comprises the steps of:

obtaining an image of an area of said cart aisle adjacent said checkout station;

processing the image of said cart aisle until said optically discernable strip is detected within said image of the cart aisle;

defining, based on the location of said optically discernable strip in the image of said cart aisle, an area of interest in said image corresponding to at least a portion of said customer cart, said area of interest defining said image of said customer cart.

4. The method recited in claim 3 wherein said optically discernable strip has a pre-defined color, and wherein said step of processing the image of said cart aisle to detect said optically discernable strip comprises the steps of:

scanning the image of said cart aisle to detect points of transition in the image between the pre-defined color of said strip and other colors in the image; and processing the detected points of transition in accordance with a least-squares-fit algorithm to generate a line representative of the location of said strip.

5. The method recited in claim 3 wherein first and second optically discernable strips are attached to a front end and a rear end, respectively, of said customer cart and wherein said area of interest in the image of the cart aisle is defined based on the location of either one of said first and second strips within the image.

6. The method recited in claim 1 wherein the empty cart image data comprises a histogram representing color features of at least one image of a known empty cart and wherein the image of said customer cart is compared to the empty cart image data by generating a histogram representing color features of the image of said customer cart, and then comparing that histogram to the empty cart image data.

7. The method recited in claim 6 wherein the image of said customer cart comprises a plurality of pixels at least some of which having a determinable hue, and wherein the histogram representing color features of the image of said customer cart is derived from the hue of different pixels in the image.

8. The method recited in claim 7 wherein the histogram representing color features of the image of said customer cart has a plurality of bins, each bin representing a different range of hues and containing a count of the number of pixels in the image of said customer cart that have a hue within that range.

9. The method recited in claim 6 wherein said empty cart image data comprises a statistical representation of color feature data generated from a plurality of images of at least one known empty cart.

10. A security system for use in preventing fraud in a retail or like environment in which customers utilize carts to bring items to be purchased to a checkout station having a cart aisle through which the carts pass, said system comprising:

(a) means for obtaining and storing first data representative of an image of a known empty cart;

(b) means for obtaining second data representative of an image of a customer cart when a customer arrives at said checkout station with said customer cart to perform a transaction for the purchase of selected items; and (c) means for comparing said first and second data and for determining from said comparison whether said customer cart is empty; wherein said items to be purchased in said transaction have identifying codes associated with them, and wherein the system further comprises:

means for detecting the codes associated with items to be purchased in said transaction as said items are removed from said customer cart;

means for determining whether a code has been detected for an item that is permitted to be in the customer cart, if said customer cart is determined not to be empty; and means for initiating an action to deter a possible attempt by the customer to leave the premises without paying for an item in the customer cart, when said cart is determined not to be empty and no code has been detected for an item that is permitted to be in the cart.

11. The system recited in claim 10 further comprising means for initiating an action to deter a possible attempt by the customer to leave the premises without paying for an item in the customer cart, if it is determined that the customer cart is not empty and that a non-empty cart is not permitted for said transaction.

12. The system recited in claim 10 further comprising:

an optically discernable strip affixed at a predetermined location on said customer cart;

means for obtaining an image of an area of said cart aisle adjacent said checkout station and for processing the image of said cart aisle until said optically discernable strip is detected within the image; and means for defining, based on the location of said optically discernable strip within the image of said cart aisle, an area of interest in the image corresponding to at least a portion of said customer cart, said area of interest defining the image of said customer cart.

13. The system recited in claim 12 wherein said optically discernable strip has a pre-defined color, and wherein said means for processing the image of said cart aisle comprises:

means for scanning the image of said cart aisle to detect points of transition in the image between the pre-defined color of said strip and other colors in the image; and means for processing the detected points of transition in accordance with a least-squares-fit algorithm to generate a line representative of the location of said strip.

14. The system recited in claim 12 comprising first and second optically discernable strips attached to a front end and a rear end, respectively, of said customer cart.

15. The system recited in claim 10 wherein said first data comprises a histogram representing color features of at least one image of a known empty cart and wherein said second data comprises a histogram representing color features of the image of said customer cart.

16. The system recited in claim 15 wherein the image of said customer cart comprises a plurality of pixels at least some of which having a determinable hue, and wherein the histogram representing color features of the image is derived from the hue of different pixels therein.

17. The system recited in claim 16 wherein the histogram representing color features of the image of said customer cart has a plurality of bins, each bin representing a different range of hues and containing a count of the number of pixels in the image that have a hue within that range.

18. The system recited in claim 15 wherein the first data comprises a statistical representation of color features of a plurality of images of at least one known empty cart.

* * * * *